US012664753B2

(12) United States Patent
Abdelhamed et al.

(10) Patent No.: US 12,664,753 B2
(45) Date of Patent: Jun. 23, 2026

(54) APPARATUS AND METHOD FOR MAPPING RAW IMAGES BETWEEN DIFFERENT CAMERA SENSORS UNDER ARBITRARY ILLUMINATIONS

(71) Applicant: Samsung Electronics Co., Ltd., Suwon-si (KR)

(72) Inventors: Abdelrahman Abdelhamed, Scarborough (CA); Michael S. Brown, Toronto (CA); Abhijith Punnappurath, North York (CA); Hoang Minh Le, Toronto (CA); Luxi Zhao, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 18/227,456

(22) Filed: Jul. 28, 2023

(65) Prior Publication Data

US 2024/0071041 A1 Feb. 29, 2024

Related U.S. Application Data

(60) Provisional application No. 63/401,992, filed on Aug. 29, 2022.

(51) Int. Cl.
| | |
|---|---|
| *G06K 9/00* | (2022.01) |
| *G06V 10/141* | (2022.01) |
| *G06V 10/54* | (2022.01) |
| *G06V 10/56* | (2022.01) |

(52) U.S. Cl.
CPC ............ *G06V 10/56* (2022.01); *G06V 10/141* (2022.01); *G06V 10/54* (2022.01)

(58) Field of Classification Search
CPC ...... G06V 10/56; G06V 10/141; G06V 10/54; G06V 10/774; G06T 1/20; G06T 5/60;
(Continued)

(56) References Cited

U.S. PATENT DOCUMENTS

| | | |
|---|---|---|
| 11,321,939 B2 | 5/2022 | Price et al. |
| 11,394,892 B2 | 7/2022 | Lee et al. |

(Continued)

FOREIGN PATENT DOCUMENTS

| | | |
|---|---|---|
| CN | 108961190 A | 12/2018 |
| JP | 5457845 A | 4/2014 |

(Continued)

OTHER PUBLICATIONS

Gao et al ("Improving Color Constancy by Discounting the Variation of Camera Spectral Sensitivity", Arxiv.org, Cornell University Library, 201 Olin Library Cornell University Ithaca, NY 14853, Sep. 6, 2016, XP081361439. (Year: 2016).*

(Continued)

*Primary Examiner* — Duy M Dang
(74) *Attorney, Agent, or Firm* — Sughrue Mion, PLLC

(57) ABSTRACT

A method for processing image data, including obtaining a raw input image that is captured using a first image sensor under an input illumination condition; obtaining, using a transform estimator, a color transform that maps a characteristic of the first image sensor to a characteristic of a second image sensor, based on the input illumination condition; and generating a raw output image having the characteristic of the second image sensor based on the raw input image and the color transform.

21 Claims, 18 Drawing Sheets

700

Collect datasets under different illuminations using first sensor and second sensor
S701

Extract illuminations, and compute transforms between the image datasets
S702

Train transform estimator using illuminations and transforms
S703

Convert raw input image from first sensor to second sensor
S704

(58) Field of Classification Search
CPC .......... G06T 2207/20081; G06T 2207/20084; H04N 1/6055; H04N 1/6086; H04N 17/002; H04N 23/10; H04N 23/45; H04N 23/85; H04N 23/88; G06N 3/02; G06N 3/04; G06N 3/084; G06N 3/0499; G06N 20/00
See application file for complete search history.

(56) References Cited

U.S. PATENT DOCUMENTS

| 2019/0272625 A1 | 9/2019 | Lim et al. |
| 2020/0137290 A1 | 4/2020 | Lee et al. |
| 2021/0058596 A1 | 2/2021 | Afifi et al. |
| 2022/0164601 A1 | 5/2022 | Lo et al. |

FOREIGN PATENT DOCUMENTS

| JP | 2021-57242 A | 4/2021 |
| KR | 10-2350610 B1 | 1/2022 |
| KR | 10-2022-0056067 A | 5/2022 |
| WO | 2021/199367 A1 | 10/2021 |
| WO | 2022/167096 A1 | 8/2022 |

OTHER PUBLICATIONS

International Search Report and Written Opinion issued by the International Searching Authority on Nov. 27, 2023 for International Patent Application No. PCT/KR2023/012350 (PCT/ISA/220, PCT/ISA/210, and PCT/ISA/237).
Extended European Search Report dated Jun. 13, 2025, issued by the European Patent Office in European Application No. 23860754.3.
Gao et al., "Improving Color Constancy by Discounting the Variation of Camera Spectral Sensitivity", 2016, XP081361439, pp. 1-13 (13 pages total).
Abdelrahman et al., "Leveraging the Availability of Two Cameras for Illuminant Estimation", 2021, XP034010258, pp. 6633-6642 (10 pages total).

* cited by examiner

Image Sensor RGB response to first illumination condition $[R_1, G_1, B_1]$

20

320

301

$[R_2, G_2, B_2]$

Image Sensor RGB response to second illumination condition

20

Collect datasets under different illuminations using first sensor and second sensor
S701

Extract illuminations, and compute transforms between the image datasets
S702

Train transform estimator using illuminations and transforms
S703

Convert raw input image from first sensor to second sensor
S704

Figure 15:
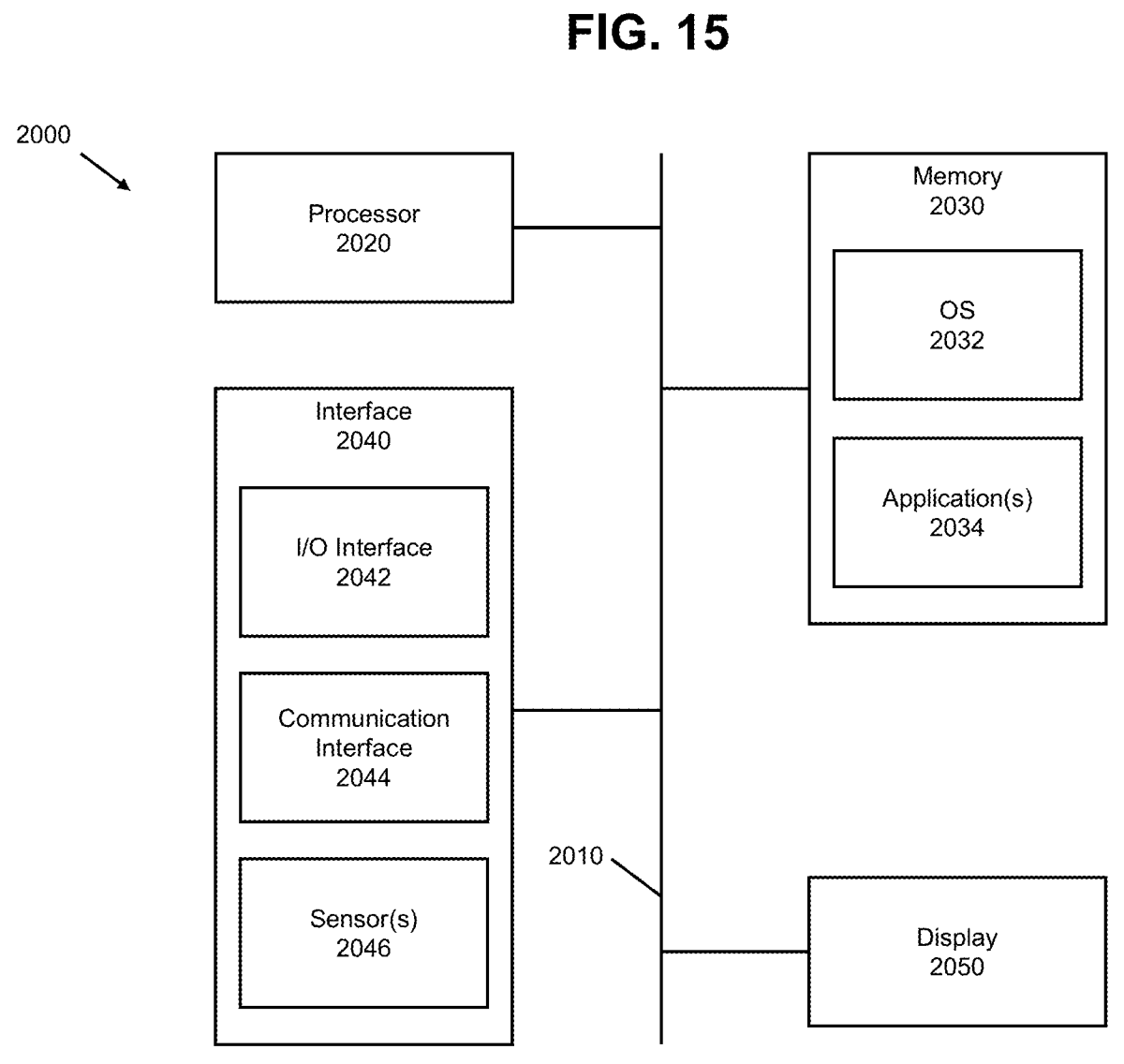

Processor 2020

Memory 2030

OS 2032

Application(s) 2034

Display 2050

2010

Interface 2040

I/O Interface 2042

Communication Interface 2044

Sensor(s) 2046

APPARATUS AND METHOD FOR MAPPING RAW IMAGES BETWEEN DIFFERENT CAMERA SENSORS UNDER ARBITRARY ILLUMINATIONS

CROSS-REFERENCE TO RELATED APPLICATION(S)

This application is based on and claims priority under 35 U.S.C. § 119 to U.S. Provisional Patent Application No. 63/401,992 filed on Aug. 29, 2022, in the U.S. Patent & Trademark Office, the disclosure of which is incorporated herein by reference in its entirety.

BACKGROUND

1. Field

The disclosure relates to an apparatus and a method for converting colors of a raw input image that is captured using a first sensor under any arbitrary illumination to colors corresponding to a second sensor under the arbitrary illumination, such that a raw output image appears as if it had been captured using the second sensor.

2. Description of Related Art

Capturing raw sensor images under various settings is quite challenging, especially under various illuminations and lighting conditions. The process requires adjusting camera settings, using tripods, setting up the scene, and likely finding different lighting conditions and environments. With such limitations, it is effort and time consuming to capture large scale data sets of raw images for training neural network models.

For example, a mobile device is updated with a new image sensor, new training data sets need to be recaptured because the new image sensor may have different characteristics (e.g., spectral sensitivity, noise profile, etc.). The time and effort needed to capture training data is a significant challenge to the manufacturer of the mobile device and other smartphone and camera companies.

Therefore, there has been a demand for a simplified process for creating new data sets of raw images which can be used to train neural network models to be used with a new image sensor.

SUMMARY

One or more embodiments of the present disclosure provide an apparatus and method for converting colors of a raw sensor image that is captured by a first sensor to colors corresponding to a second sensor such that a raw sensor image captured by the first sensor appears as if it had been captured by the second sensor.

In accordance with an aspect of the disclosure, an electronic device for processing image data includes at least one memory configured to store instructions; and at least one processor configured to execute the instructions to: obtain a raw input image that is captured using a first image sensor under an input illumination condition; obtain, using a transform estimator, a color transform that maps a characteristic of the first image sensor to a characteristic of a second image sensor, based on the input illumination condition; and generate a raw output image having the characteristic of the second image sensor based on the raw input image and the color transform.

The characteristic of the first image sensor may include a spectral sensitivity of the first image sensor, and the characteristic of the second image sensor may include a spectral sensitivity of the second image sensor.

The transform estimator may include an artificial intelligence (AI) model which is trained based on a plurality of raw image pairs corresponding to a plurality of illumination conditions, and each raw image pair may include a first raw image captured using the first image sensor under an illumination condition from among the plurality of illumination conditions, and a second raw image captured using the second image sensor under the illumination condition.

The plurality of raw image pairs may be obtained using a variable light source configured to apply the plurality of illumination conditions to an object.

The object may include a color calibration pattern including a plurality of colors, and the color calibration pattern may include a plurality of textures corresponding to the plurality of colors.

The raw input image and the raw output image may be not white-balance corrected.

The electronic device may further include an input interface, and the at least one processor may be further configured to obtain the color transform and generate the raw output image based on receiving information about the second image sensor through the input interface.

The first image sensor may be included in an external device, and the second image sensor may be included in the electronic device, the electronic device may further include a communication interface configured to receive the raw input image from the external device, and the at least one processor may be further configured to execute the instructions to convert the raw input image that is received from the external device, into the raw output image having the characteristic of the second image sensor based on the color transform.

The at least one processor may be further configured to execute the instructions to: obtain an image data set may include a plurality of raw first images captured using the first image sensor; obtain, using the transform estimator, a plurality of color transforms that map the characteristic of the first image sensor to the characteristic of the second image sensor, wherein the plurality of color transforms may include the color transform; create a transformed data set may include a plurality of raw second images having the characteristic of the second image sensor based on the plurality of raw first images and the plurality of color transforms, wherein the plurality of raw second images may include the raw output image; and input the transformed data set to an artificial intelligence (AI)-based image processing model to train the AI-based image processing model.

The electronic device may further include the first image sensor and the second image sensor, the raw input image may be a first raw input video frame, the raw output image may be a raw output video frame, and the at least one processor may be further configured to: obtain a second raw input video frame that is captured using the second image sensor; and generate a video based on the raw output video frame and the second raw input video frame.

In accordance with an aspect of the disclosure, a method for processing image data is performed by at least one processor includes obtaining a raw input image that is captured using a first image sensor under an input illumination condition; obtaining, using a transform estimator, a color transform that maps a characteristic of the first image sensor to a characteristic of a second image sensor, based on the input illumination condition; and generating a raw output image having the characteristic of the second image sensor based on the raw input image and the color transform.

The characteristic of the first image sensor may include a spectral sensitivity of the first image sensor, and the characteristic of the second image sensor may include a spectral sensitivity of the second image sensor.

The transform estimator may include an artificial intelligence (AI) model which is trained based on a plurality of raw image pairs corresponding to a plurality of illumination conditions, and each raw image pair may include a first raw image captured using the first image sensor under an illumination condition from among the plurality of illumination conditions, and a second raw image captured using the second image sensor under the illumination condition.

The plurality of raw image pairs may be obtained using a variable light source configured to apply the plurality of illumination conditions to an object.

The object may include a color calibration pattern including a plurality of colors, and the color calibration pattern may include a plurality of textures corresponding to the plurality of colors.

The color transform may be obtained and the raw output image is generated based on receiving information about the second image sensor through an input interface.

The first image sensor may be included in a first electronic device, and the second image sensor may be included in a second electronic device which includes the at least one processor, the second electronic device may include a communication interface configured to receive the raw input image from the first electronic device, and the method further may include converting the raw input image that is received from the first electronic device, into the raw output image having the characteristic of the second image sensor based on the color transform.

The method further may include: obtaining an image data set may include a plurality of raw first images captured using the first image sensor; obtaining, using the transform estimator, a plurality of color transforms that map the characteristic of the first image sensor to the characteristic of the second image sensor, wherein the plurality of color transforms may include the color transform; creating a transformed data set may include a plurality of raw second images having the characteristic of the second image sensor based on the plurality of raw first images and the plurality of color transforms, wherein the plurality of raw second images may include the raw output image; and inputting the transformed data set to an artificial intelligence (AI)-based image processing model to train the AI-based image processing model.

The at least one processor, the first image sensor, and the second image sensor may be included in an electronic device, the raw input image may be a first raw input video frame, the raw output image may be a raw output video frame, and the method further may include: obtaining a second raw input video frame that is captured using the second image sensor; and generating a video based on the raw output video frame and the second raw input video frame.

In accordance with an aspect of the disclosure, a non-transitory computer-readable medium is configured to store instructions which, when executed by at least one processor of a device for processing image data, cause the at least one processor to: obtain a raw input image that is captured using a first image sensor under an input illumination condition; obtain, using a transform estimator, a color transform that maps a characteristic of the first image sensor to a characteristic of a second image sensor, based on the input illumination condition; and generate a raw output image having the characteristic of the second image sensor based on the raw input image and the color transform.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 2 is a diagram illustrating an example of capturing images under an arbitrary illumination condition using different image sensors, according to embodiments of the present disclosure;

FIGS. 8A and 8B illustrate a method of collecting illumination data sets using two sensors for estimating a color transform, according to embodiments of the present disclosure;

FIG. 15 is a diagram of components of one or more devices of FIG. 14 according to embodiments of the present disclosure.

DETAILED DESCRIPTION

Figure 1:
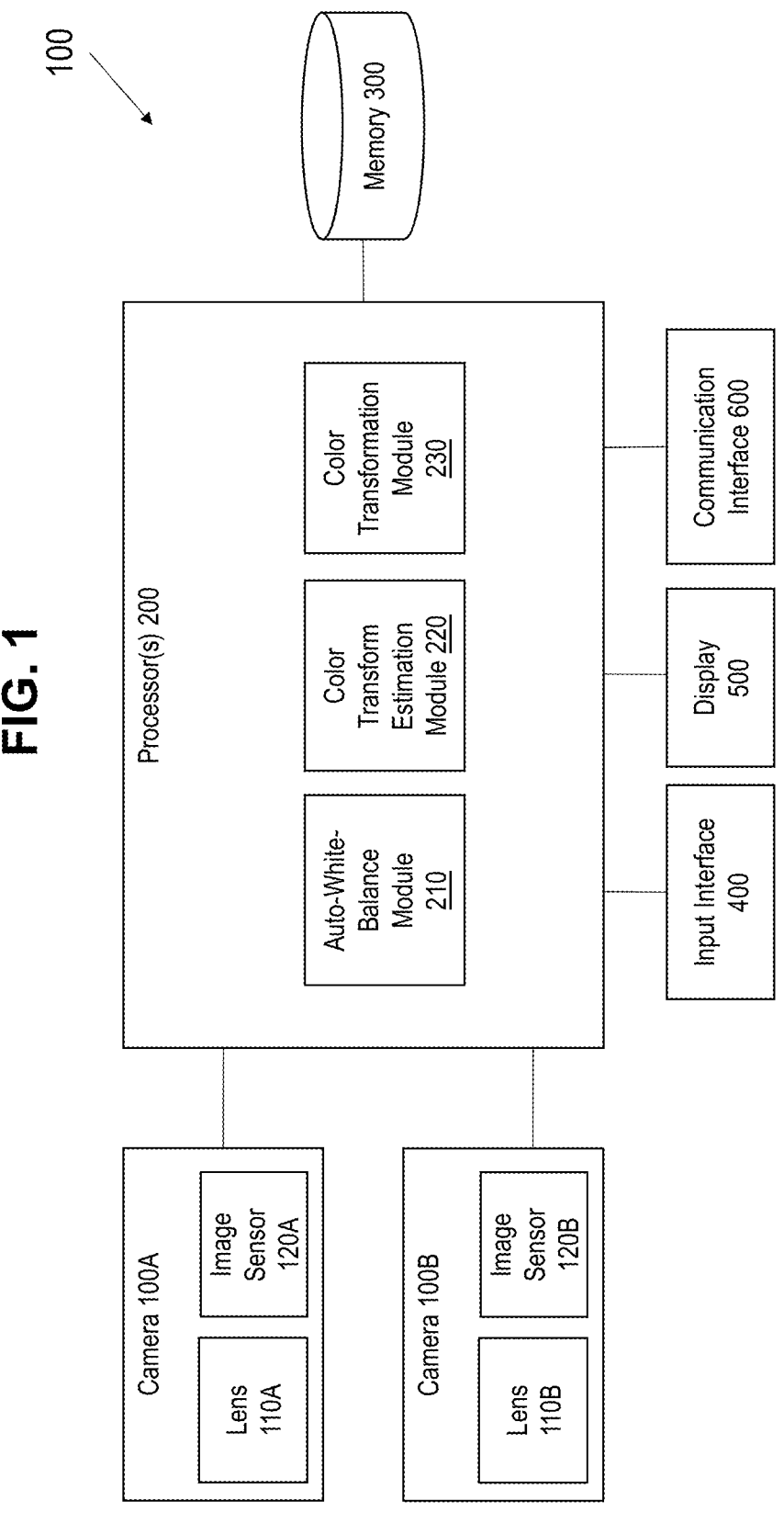
FIG. 1 is a diagram of an electronic device for performing color transformation according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "module" or "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

One or more embodiments of the present disclosure provide methods and apparatuses for performing an image processing process that includes estimating a color transform that maps a raw input image captured using a first image sensor to a second image sensor, and applying the color transform to the raw input image to obtain a raw output image which has a characteristic of the second image sensor.

The raw input image may be an unprocessed raw image that is output from the first image sensor. The term "raw image" may refer to an unprocessed digital output of an image sensor of a camera, and may be also referred to as a "raw burst image" or "Bayer image." Light or photons incident from a scene are digitalized and recorded by a camera sensor, and the raw image is constituted with digital pixel intensity values recorded by the camera sensor before any processing is applied. For example, the raw image is an image that is not processed via an image signal processor (ISP) or an image processing unit (IPU), and may have a raw Bayer format. When the camera sensor includes sensor elements that are arranged in a pattern of red, green, and blue color channels, which is called a Bayer array, an image recorded by the Bayer array on the camera sensor is called the Bayer image.

In embodiments, the term "raw image" may also refer to a partially-processed image, for example an otherwise unprocessed image to which demosaicing or denoising has been applied. In addition, the term "raw image" may refer to a fused raw image obtained from a burst of raw image frames, such as in formats such as ProRAW, ExpertRAW, etc. In embodiments, the term "raw image" may refer to an image which has not had processing such as white-balance correction and subsequent color manipulations applied.

FIG. 1 is a diagram of a system for performing color transformation according to embodiments of the present disclosure.

As shown in FIG. 1, the system 100 may include a first camera 100A, a second camera 100B, at least one processor 200, at least one memory 300, an input interface 400, a display 500, and a communication interface 600.

The first camera 100A may include a first lens 110A, and a first image sensor 120A that may include a complementary metal oxide semiconductor (CMOS) sensor or a charge-coupled device (CCD) sensor, and a color filter array (CFA). The first camera 100A may capture an image based on a user input that is received via the input interface 400, and may output an unprocessed raw image to the processor 200. The input interface 400 may be implemented as at least one of a touch panel, a keyboard, a mouse, a button, a microphone, and the like.

Similarly, the second camera 100B may include a second lens 110B, and a second image sensor 120B that may include a CMOS sensor or a CCD sensor, and a CFA. The second camera 100B may capture an image based on a user input that is received via the input interface 400, and may output an unprocessed raw image to the processor 200.

Although the first camera 100A and the second camera 100B are illustrated in FIG. 1 as being directly connected to the processor 200, embodiments are not limited thereto. For example, each of the first camera 100A and the second camera 100B may be connected to a separate processor 200. As another example, one or both of the first camera 100A and the second camera 100B may be indirectly connected to one or more processors 200, and images captured using one or both of the first camera 100A and the second camera 100B may be transmitted in a wired or wireless manner to the one or more processors 200. For example, one or both of the first camera 100A and the second camera 100B the first camera may be included in an external electronic device which is external to the system 100, and the processor 200 may receive raw images captured using one or both of the first image sensor 120A and the second image sensor 120B through the communication interface 600.

The processor 200 may include an artificial intelligence (AI)-based image processing model that includes an auto-white-balance module 210, a color transform estimation module 220, and a color transformation module 230. While the auto-white-balance module 210 is illustrated as being provided outside the first camera 100A and the second camera 100B, the auto-white-balance module 210 may be provided inside one or both of the first camera 100A and the second camera 1006, depending on embodiments. The processor 200 may receive a raw input image from at least one of the first camera 100A and the second camera 100B, or from an external device via the communication interface 600. The raw input image may be a raw image that is not processed by an image signal processor (ISP), and/or which has a Bayer format.

Based on a user input for editing the raw input image, for example, a user input requesting color transformation to convert the raw input image to a raw output image having different characteristics, the processor 200 may perform color transformation on the raw input image, and output the color-transformed raw input image as a raw output image. The processor 200 may store the raw output image in the memory 300 as an augmented image or a synthesized image, for example as part of an image data set.

In embodiments, the processor 200 may further include an image signal processor (ISP), which may perform image processing on at least one of the raw input image and the raw output image in order to generate a processed image which may be displayed on the display 500. In embodiments, the processed image may also be referred to as a display-referred image or an sRGB image.

In embodiments of the disclosure, the processor 200 may estimate a color transform that maps a characteristic of the first image sensor 120A to a characteristic of the second image sensor 120B, and may apply the color transform to a raw input image captured using the first image sensor 120A to obtain a raw output image having the characteristic of the second image sensor 120B. Similarly, the processor 200 may estimate a color transform that maps a characteristic of the second image sensor 120B to a characteristic of the first image sensor 120A, and may apply the color transform to a raw input image captured using the second image sensor 120B to obtain a raw output image having the characteristic of the first image sensor 120A. In embodiments, the characteristic of the first image sensor 120A may be, or include, an RGB response of the first image sensor 120A. In embodiments, the RGB response of the first image sensor 120A may be affected by, or correspond to, at least one of a spectral sensitivity of the first image sensor 120A and a noise profile of the first image sensor 120A. In embodiments, the characteristic of the second image sensor 120B may be, or include, an RGB response of the second image sensor 120B. In embodiments, the RGB response of the second image sensor 120B may be affected by, or correspond to, at least one of a spectral sensitivity of the second image sensor 120B and a noise profile of the second image sensor 120B.

In embodiments, the processor 200 may estimate the color transform based on receiving information about one or both of the first image sensor 120A and the second image sensor 120B through the input interface 400. For example, based on a user input requesting color transformation to convert a raw input image captured using the first image sensor 120A to a raw output image having a characteristic of the second image sensor 120B, the processor 200 may identify the second image sensor 120B based on the user input, and may obtain the color transform based on the identified second image sensor 120B.

In embodiments, the auto-white-balance module 210 may identify an input illumination under which the raw input image is captured, and the color transform estimation module 220 may estimate a color transform corresponding to the input illumination.

In an embodiment of the present disclosure, a color transform T may be estimated using an artificial intelligence model that is trained to estimate a color transform, for example a neural network model or a machine learning model. In particular, machine learning-based methods may be used to predict the color transforms that map the characteristic of the first image sensor 120A to the characteristic of the second image sensor 120B, and/or the characteristic of the second image sensor 120B to the characteristic of the first image sensor 120A. In embodiments, the artificial intelligence model may be referred to as a transform estimator, and may be included in or implemented by the color transform estimation module 220. In estimating the color transforms, a small data set of images of color calibration patterns captured under various illumination conditions may be used without requiring a large training data set. A method of estimating the color transform T using a neural network is described in more detail below with reference to FIGS. 7, 10A, and 10B in detail. In embodiments, the color transform T may be estimated by at least one of the transform estimator and the color transform estimation module 220 using any other desired method, for example a linear mapping method, a non-linear mapping method, and a k nearest neighbors method. The color-transformed raw input image may be stored in the memory 300 as the raw output image.

All the elements of the electronic device may be included in a single device, or may be included in more than one device. For example, at least one of the first camera 100A, the second camera 100B, the input interface 400, and the display 500 may be included in a client device (e.g., a smartphone), and the AI-based image processing model of the processor 200 may be included in a server. When the AI-based image processing model is included in the server, the client device may send a raw input image and an input illumination to the server, request the server to perform color transformation on the raw input image to obtain a raw output image, and may receive the raw output image from the server.

Figure 2:
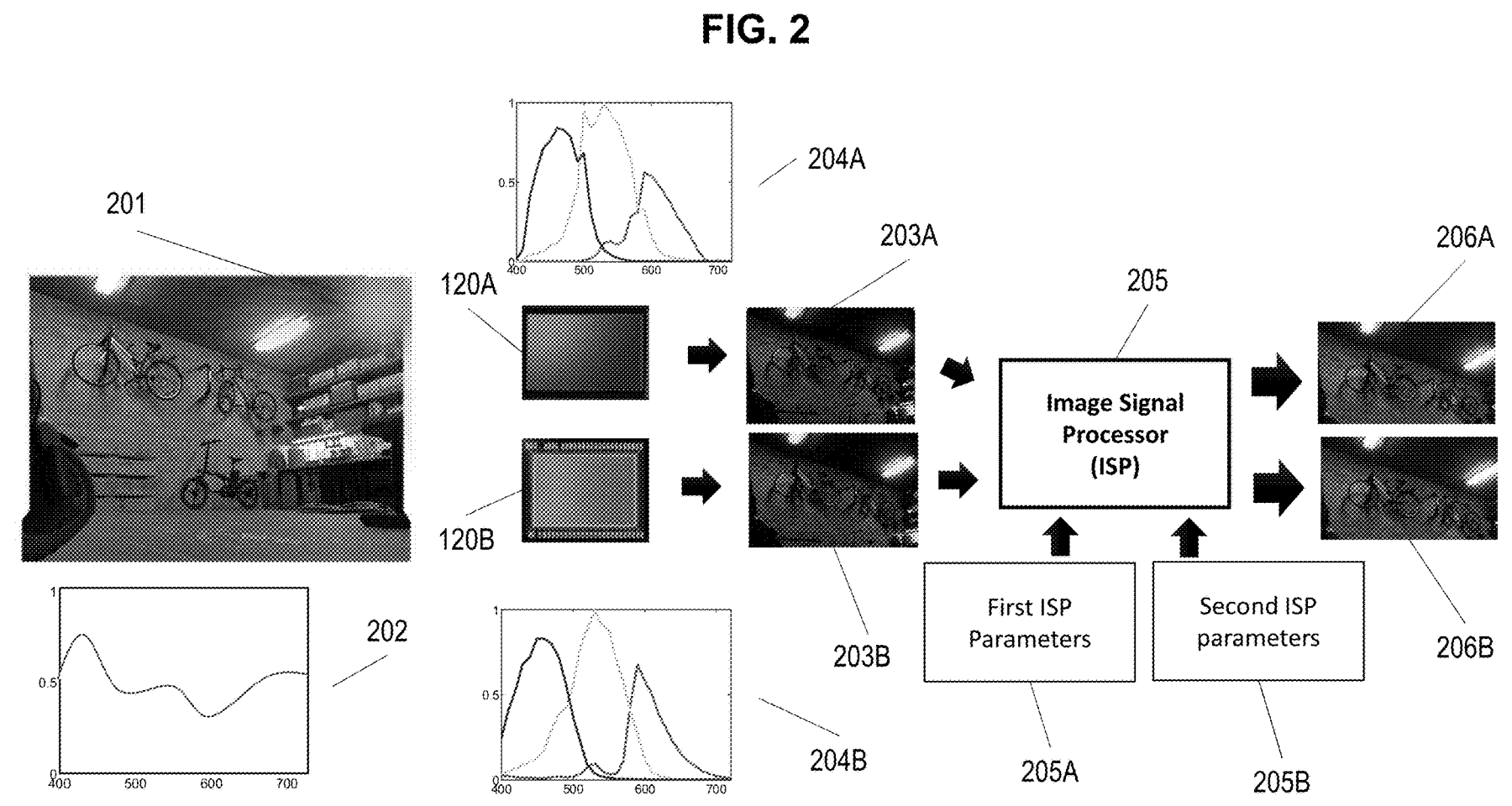

FIG. 2 is a diagram illustrating an example of images captured under an arbitrary illumination condition using different image sensors, according to embodiments of the present disclosure. As shown in FIG. 2, a scene 201 may be illuminated by a particular illumination 202. A raw image 203A of the scene 201 may be captured using the first image sensor 120A, which may have a corresponding spectral sensitivity 204A, and a raw image 203B of the scene 201 may be captured using the second image sensor 120B, which may have a corresponding spectral sensitivity 204B. The raw images 203A and 203B may be provided to an ISP 205, which may be included for example in the processor 200. The raw image 203A may be processed by the ISP 205 to obtain a processed image 206A, and the raw image 203B may be processed by the ISP 205 to obtain a processed image 206B.

In embodiments, image values of the raw images 203A and 203B may be dependent on the corresponding spectral sensitivities 204A and 204B, as well as the spectral profile of the illumination condition 202. In embodiments, the image values of the raw image 203A may be different from the image values of the raw image 203B, even though they are both images of the same scene 201 taken under the same illumination condition 202, because of differences between the spectral sensitivities 204A and 204B. In embodiments, the ISP 205 may apply image processing such as white-balance correction and other color manipulations to the raw images 203A and 203B in order to generate the processed images 206A and 206B. After the image processing is applied by the ISP 205, color values of the processed images 206A and 206B may be relatively similar, for example more similar than color values of the raw images 203A and 203B. As shown in FIG. 2, in order to process the raw images 203A and 203B to generate the processed images 206A and 206B having relatively similar color values, the ISP 205 may use different ISP parameters, for example first ISP parameters 205A which correspond to the first image sensor 120A, and second ISP parameters 205B which correspond to the second image sensor 120B.

Because different imaging sensors have different spectral sensitivities, and therefore produce raw images that have different color properties even if the images are captured under the same illumination condition and of the exact same scene, many AI models used to process raw images may be sensor-specific. In embodiments, the color properties of an imaging sensor may refer to a color response of the imaging sensor, for example an RGB response of the imaging sensor, but embodiments are not limited thereto. For example, an AI model which is trained based on an image data set including raw images captured using the first image sensor 120A may provide incorrect or undesired results when applied to raw images captured using the second image sensor 120B. Therefore, when a new sensor is developed and manufactured, a training image data set for an AI-based algorithm may need to be recaptured using the new sensor in order to train new AI models which are suitable for the new sensor. Capturing a new training image data set may require a large amount of time and resources, and this problem may be compounded by the fact that many devices such as smartphones may include multiple image sensors per device.

Therefore, embodiments of the present disclosure may relate to methods and apparatuses for transforming input raw images which have a characteristic corresponding to a first image sensor, into output raw images which have a characteristic of second image sensor. Accordingly, embodiments of the present disclosure may allow for a significant reduction in the need to capture new training image data sets. For example, when a new image sensor is developed and manufactured, embodiments may allow a previous training image data set, captured using a previous image sensor, to be converted into a new training image data set having a characteristic of the new image sensor, so that an AI model may be trained for use with the new image sensor without requiring the training data to be recaptured using the new image sensor. In addition, embodiments may allow a previous AI model to be used with images captured using the new image sensor, by converting images captured using the new image sensor into images which are suitable for the previous AI model.

Some approaches to image conversion may be performed using processed images instead of raw images. These approaches may not consider illumination, because an ISP used to generate the processed images may remove the illumination. In addition, because color changes between processed images from different sensors may be relatively small in comparison with color changes between raw images from different sensors, the training data set required for processed images may be relatively small. However, these approaches based on processed images may provide results which are less accurate than approaches based on raw images, because ISP processing may involve non-linear manipulation which may be non-reversible. In addition, training data sets which are generated based on processed images may be unsuitable for training certain AI models because some information, for example illumination information, may be lost or altered during the ISP processing.

FIGS. 3A, 3B, 4, and 5 illustrate a method of indexing images to provide an illumination data set, according to embodiments of the present disclosure. Raw images that are captured under a plurality of different illumination conditions may be stored and indexed to provide an illumination data set. The raw images that are captured under a plurality of different illumination conditions may be referred to as color calibration images. An example of a light box which may be used to capture the color calibration images is described in greater detail below with respect to FIG. 8A.

Figure 3A:
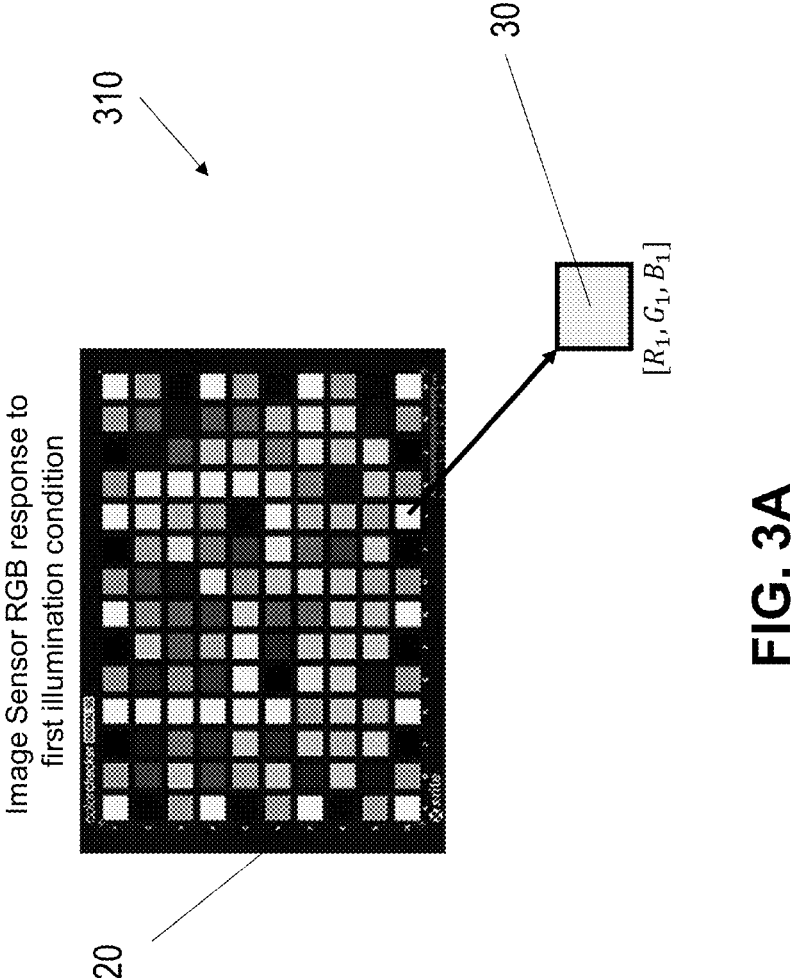
FIGS. 3A, 3B, 4, and 5 illustrate a method of indexing images to provide an illumination data set, according to embodiments of the present disclosure.
Figure 3B:
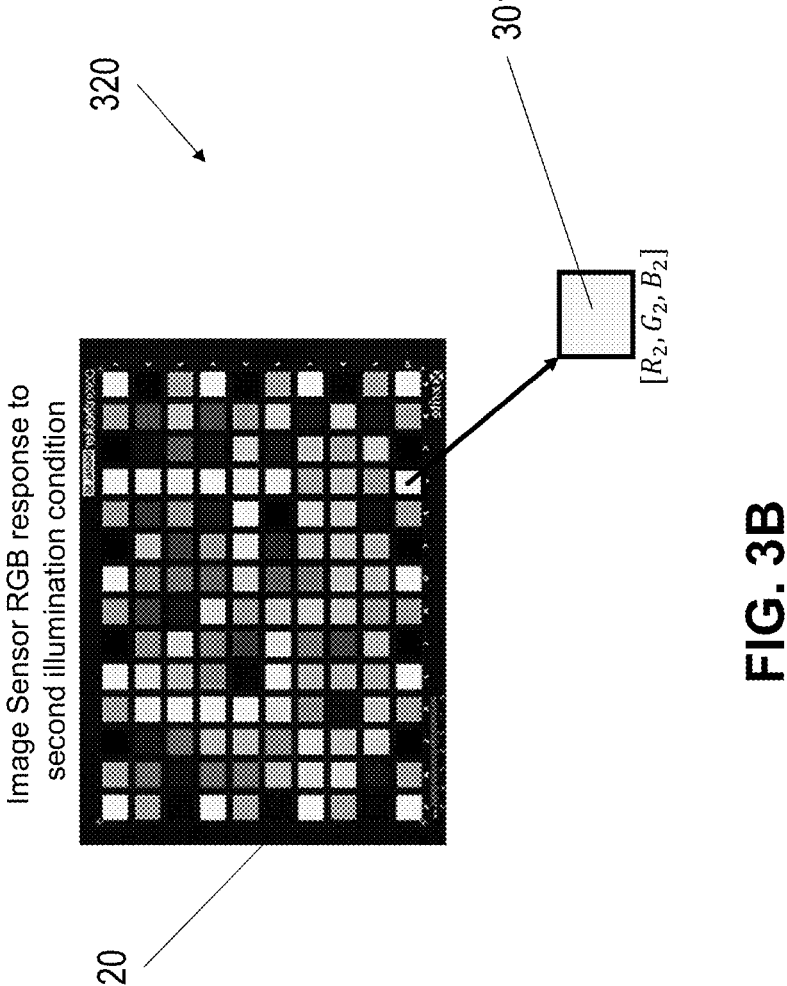

FIGS. 3A and 3B illustrate examples of images of a color calibration pattern 20 which are captured using the same image sensor under different illumination conditions. In particular, FIG. 3A illustrates a color calibration image 310 captured using the image sensor under a first illumination condition, and FIG. 3B illustrates a color calibration image 320 captured using the same image sensor under a second illumination condition. The color calibration pattern 20 may include a neutral patch 301, which may also be referred to as an achromatic patch or a gray patch, and which may be used to determine RGB color values which indicate the illuminations under which the color calibration images 310 and 320 were captured. For example, the illumination in the color calibration image 310 may correspond to RGB values $[R_1, G_1, B_1]$, and the illumination in the color calibration image 320 may correspond to RGB values $[R_2, G_2, B_2]$.

Figure 4:
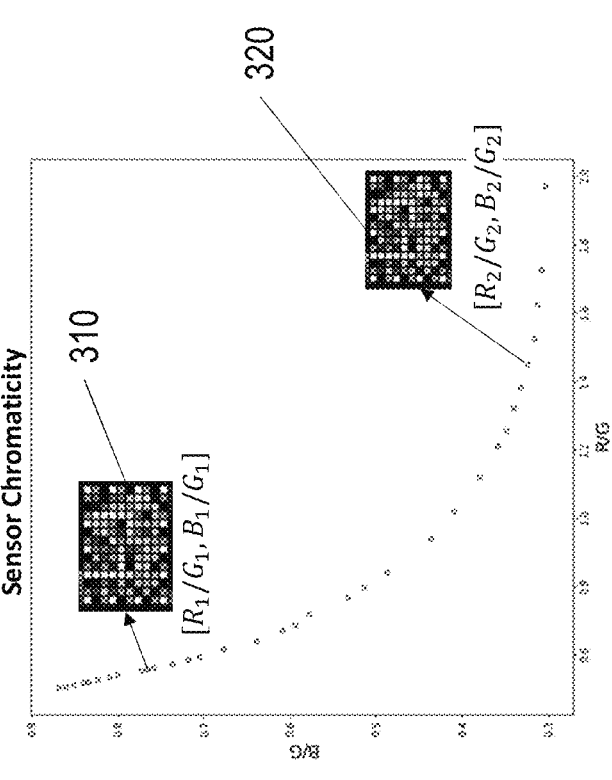

As shown in FIG. 4, each of the color calibration images in an illumination data set may be indexed based on a scene illumination using a two-dimensional coordinate $[R/G, B/G]$, and stored as an illumination data set. For example, the first illumination condition and the second illumination condition may be indexed using the two-dimensional coordinates $L_1=[R_1/G_1, B_1/G_1]$ and $L_2=[R_2/G_2, B_2/G_2]$, respectively, and stored as the illumination data set. In embodiments, the set of two-dimensional coordinate $[R/G, B/G]$ may be referred to as a chromaticity space.

In embodiments, a first illumination data set under a set of illumination conditions may be captured using the first image sensor 120A with corresponding illumination values $L_1$ to $L_M$ as recorded by the first image sensor, and a second illumination data set under the same illumination conditions may be captured using the second image sensor 120B. For each illumination $L_1$ included in the illumination data sets, a transform $$T_{A \to B}^{L_j}$$

may be determined which maps the first color calibration image to the second color calibration image. In embodiments, the transform $$T_{A \to B}^{L_j}$$

may be calculated using, for example, a least squares method. In embodiments, the transform $$T_{A \to B}^{L_j}$$

corresponding to the illumination $L_j$ may include a plurality of parameters t, which may be arranged in a matrix form according to Equation 1 below:

$$T_{A \to B}^{L_j} = \begin{bmatrix} t_1 & t_2 & t_3 \\ t_4 & t_5 & t_6 \\ t_7 & t_8 & t_9 \end{bmatrix} \qquad \text{Equation 1}$$

Although the transform $$T_{A \to B}^{L_j}$$

is illustrated as a 3×3 matrix, embodiments are not limited thereto, and the transform $$T_{A \to B}^{L_j}$$

may be expressed as a matrix of any size, or in another form such as a polynomial. In embodiments, the illumination $L_j$ may correspond to a color calibration image $I_{A_j}$ included in the first illumination data set and a color calibration image $I_{B_j}$ included in the second illumination data set, where $I_{A_j}$ and $I_{B_j}$ may be expressed according to Equation 2 and Equation 3 below:

$$I_{A_j} = \begin{bmatrix} R_{A_1} & R_{A_2} & \dots & R_{A_P} \\ G_{A_1} & G_{A_2} & \dots & G_{A_P} \\ B_{A_1} & B_{A_2} & \dots & B_{A_P} \end{bmatrix} \qquad \text{Equation 2}$$

$$I_{B_j} = \begin{bmatrix} R_{B_1} & R_{B_2} & \dots & R_{B_P} \\ G_{B_1} & G_{B_2} & \dots & G_{B_P} \\ B_{B_1} & B_{B_2} & \dots & B_{B_P} \end{bmatrix} \qquad \text{Equation 3}$$

In embodiments, the transform $$T_{A \to B}^{L_j}$$

between the color calibration images $I_{A_j}$ and $I_{B_j}$ may be estimated using a least squares method by solving Equation 4 below:

$$\begin{bmatrix} t_1 & t_2 & t_3 \\ t_4 & t_5 & t_6 \\ t_7 & t_8 & t_9 \end{bmatrix} \begin{bmatrix} R_{A_1} & R_{A_2} & \dots & R_{A_P} \\ G_{A_1} & G_{A_2} & \dots & G_{A_P} \\ B_{A_1} & B_{A_2} & \dots & B_{A_P} \end{bmatrix} = \begin{bmatrix} R_{B_1} & R_{B_2} & \dots & R_{B_P} \\ G_{B_1} & G_{B_2} & \dots & G_{B_P} \\ B_{B_1} & B_{B_2} & \dots & B_{B_P} \end{bmatrix} \quad \text{Equation 4}$$

As used in Equation 2, Equation 3, and Equation 4, P denotes a number of color samples included in the color calibration images.

Figure 5:
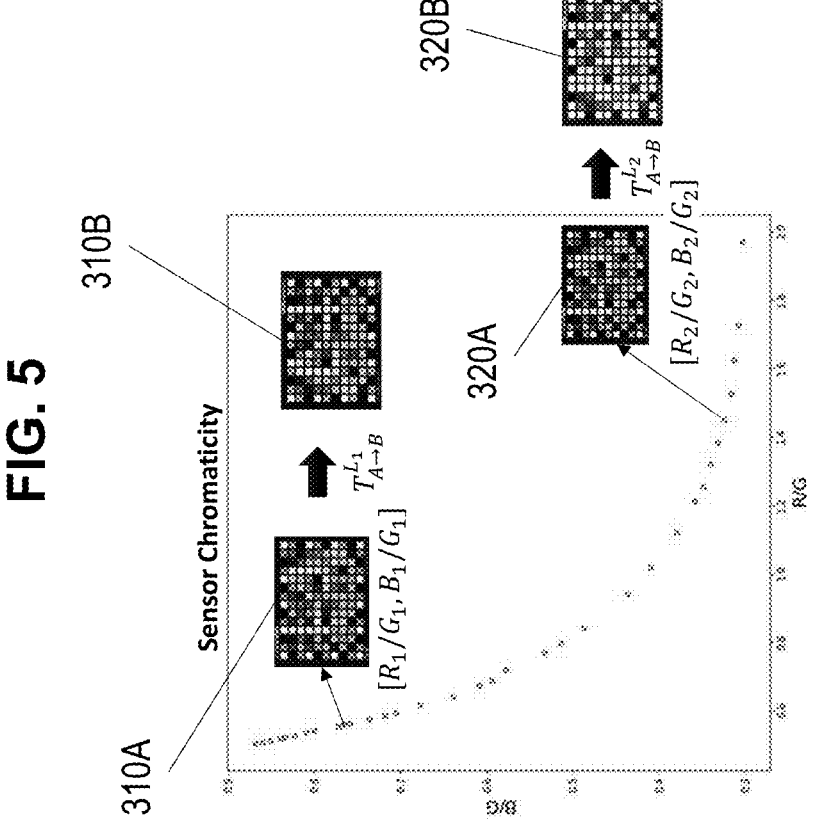

As shown in FIG. 5, the first illumination data set may include a color calibration image 310A captured under a first illumination condition corresponding to the first illumination $L_1$ as recorded by the first image sensor, and the second illumination data set may include a color calibration image 310B captured under the first illumination condition, and a transform $$T_{A \to B}^{L_1}$$

may be calculated using the color calibration images 310A and 3108. The transform may be used to convert images captured using the first image sensor 120A under the first illumination condition into images having a characteristic of the second image sensor 120B under the first illumination condition. Similarly, the first illumination data set may include a color calibration image 320A captured under a second illumination condition corresponding to the second illumination $L_2$ as recorded by the first image sensor, and the second illumination data set may include a color calibration image 320B captured under the second illumination condition, and a transform $$T_{A \to B}^{L_2}$$

may be calculated using the color calibration images 320A and 320B. The transform $$T_{A \to B}^{L_2}$$

may be used to convert images captured using the first image sensor 120A under the second illumination condition into images having a characteristic of the second image sensor 120B under the second illumination condition. Accordingly, a transform data set $$\left\{ L_j, T_{A \to B}^{L_j} \right\}_{j=1}^{M}$$

may be constructed, which may be used to transform images captured using any of the illuminations $L_1$ through $L_M$.

Figure 6:
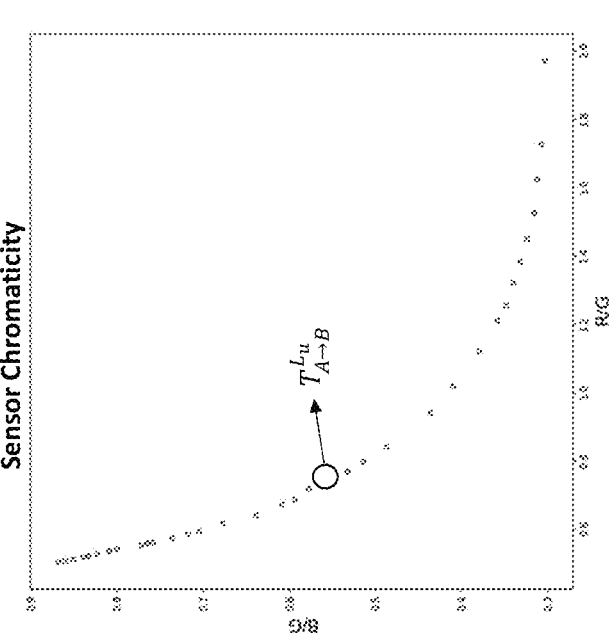
FIG. 6 illustrates an example of an arbitrary input illumination which does not exist in an illumination data set.

FIG. 6 illustrates an example of an arbitrary input illumination which does not exist in an illumination data set. In embodiments, the illumination $L_u$ may not be included in the predetermined illuminations $L_1$ through $L_M$, and therefore a transform $$T_{A \to B}^{L_u}$$

may not be known. If one of the transforms $$T_{A \to B}^{L_j}$$

included in the transform data set $$\left\{ L_j, T_{A \to B}^{L_j} \right\}_{j=1}^{M}$$

is used to convert an input raw image corresponding to the illumination $L_u$, the resulting output raw image may have inaccurate or incorrect colors.

Therefore, embodiments of the present disclosure may use learning-based methods to predict transforms that map between different image sensors under arbitrary illumination conditions. For example, embodiments of the present disclosure may relate to training a neural network such as a multi-layer perceptron using a relatively small training data set, and using the neural network to predict transforms corresponding to arbitrary illuminations, including illuminations which are not included in the data set. In embodiments, the training data set may correspond to the transform data set $$\left\{ L_j, T_{A \to B}^{L_j} \right\}_{j=1}^{M}$$

discussed above, and may be generated based on, for example, 50 to 100 pairs of color calibration images captured using the first and second image sensors 120A and 120B.

Figure 7:
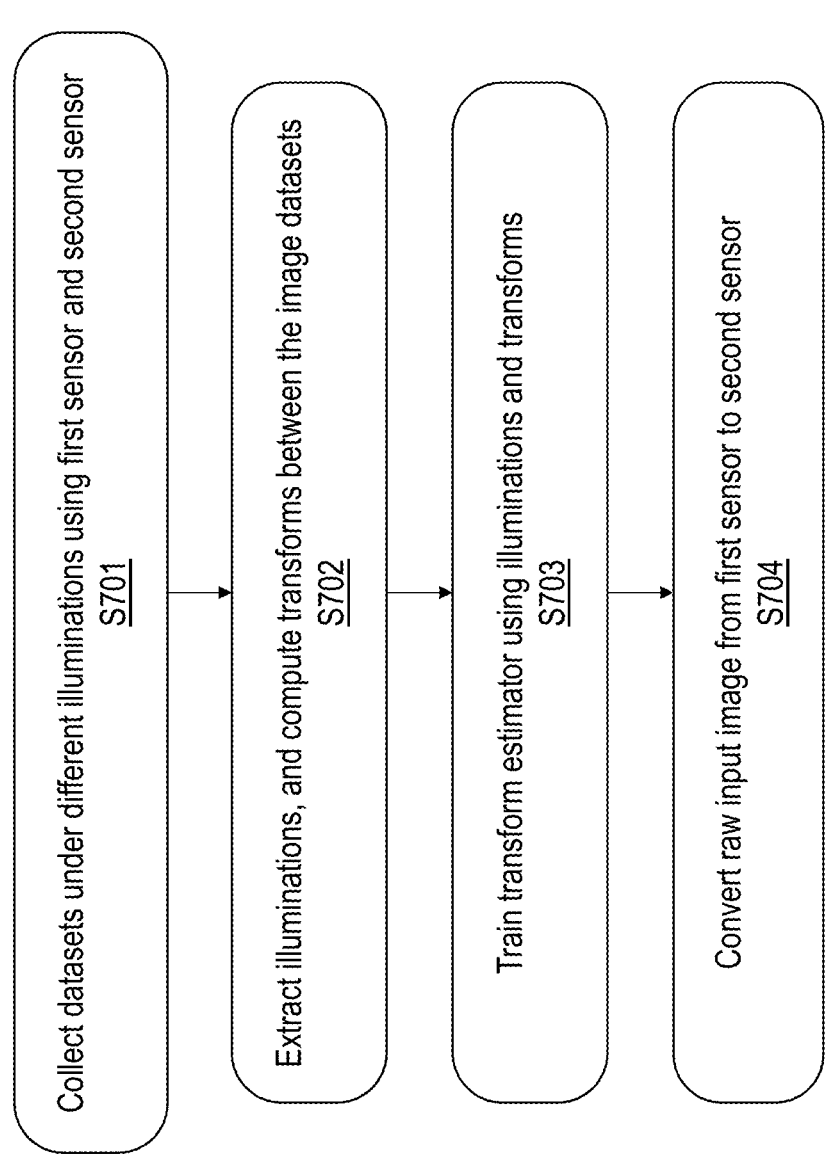
FIG. 7 is a flowchart of a process for training an AI model to convert images captured under arbitrary illumination conditions, according to embodiments of the present disclosure.
Figure 7:
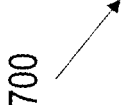

FIG. 7 illustrates a process for predicting a transform, according to embodiments of the present disclosure. In embodiments, one or more operations of the process 700 may be performed by any of the elements discussed above, for example at least one of the system 100, the processor 200, the color transform estimation module 220, and the color transformation module 230. In embodiments, the process 700 may be referred to as a color transformation method.

In operation S701, the process 700 may include collecting a first illumination data set including color calibration images captured using a first image sensor, for example the first image sensor 120A, and a second illumination data set including color calibration images captured using a second image sensor, for example the second image sensor 120B. An example of a process of capturing the illumination data sets is described in more detail below with reference to FIGS. 8A and 8B.

In operation S702, the process 700 may include extracting illuminations and computing transforms corresponding to the first and second illumination data sets. An example of a process of extracting the illuminations and computing the transforms is described in more detail below with reference to FIG. 9.

In operation S703, the process 700 may include training a transform estimator using the illuminations and transforms obtained in operation S702. An example of a process of training the transform estimator is described in more detail below with reference to FIGS. 10A and 10B.

In operation S704, the process 700 may include using a transform predicted by the transform estimator to convert at least one raw input image captured using the first image sensor to a raw output image having a characteristic of the second image sensor. An example of a process of converting the raw input image is described in more detail below with reference to FIG. 11.

Although the process 700 described above relates to converting a raw input image captured using the first image sensor 120A to a raw output image having a characteristic of the second image sensor 120B, embodiments are not limited thereto. For example, in embodiments the transform estimator may be trained to predict transforms for converting from the second image sensor 120B to the first image sensor 120A, and operation S704 may include converting at least one raw input image captured using the second image sensor 120B to a raw output image having a characteristic of the first image sensor 120A.

Figure 8A:
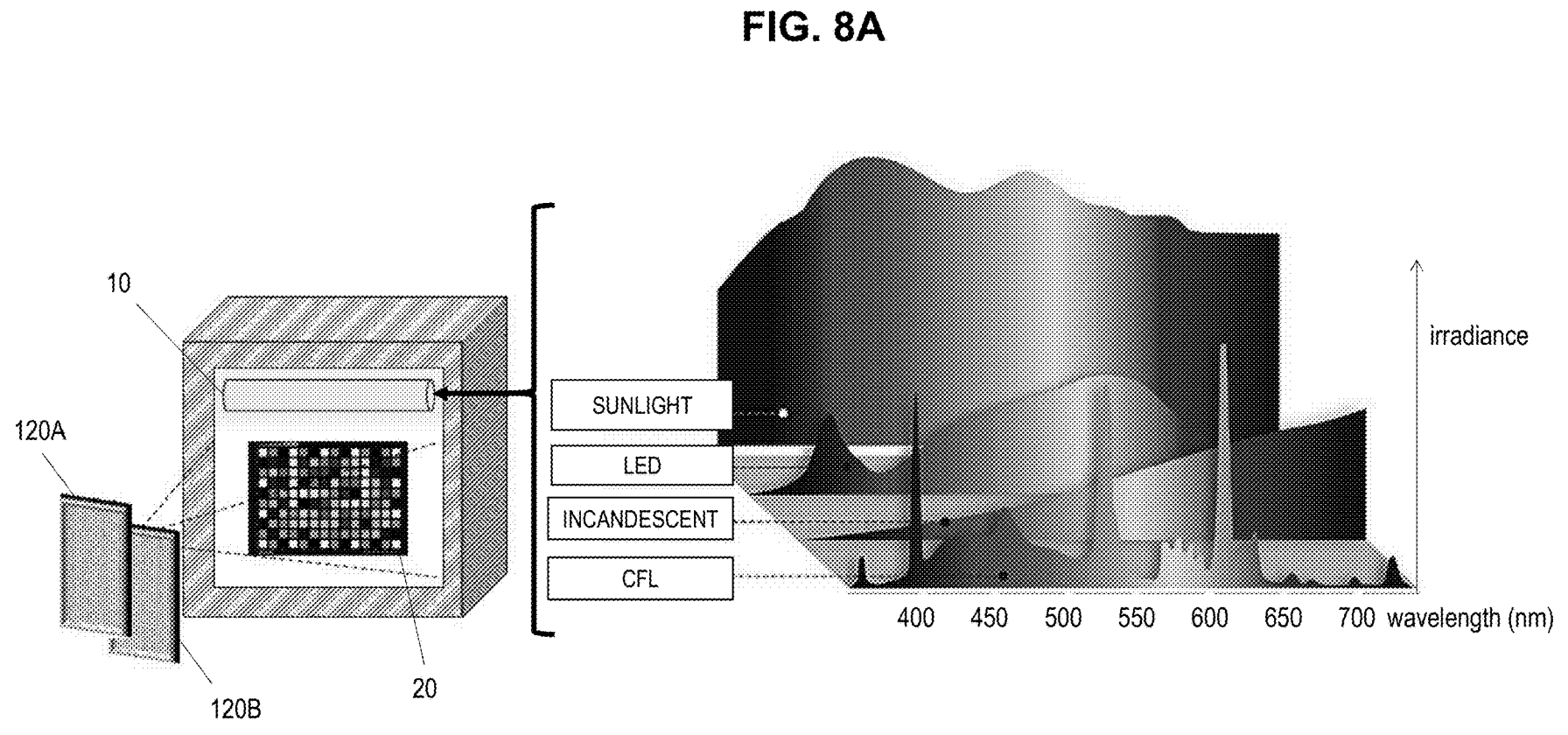
Figure 8B:
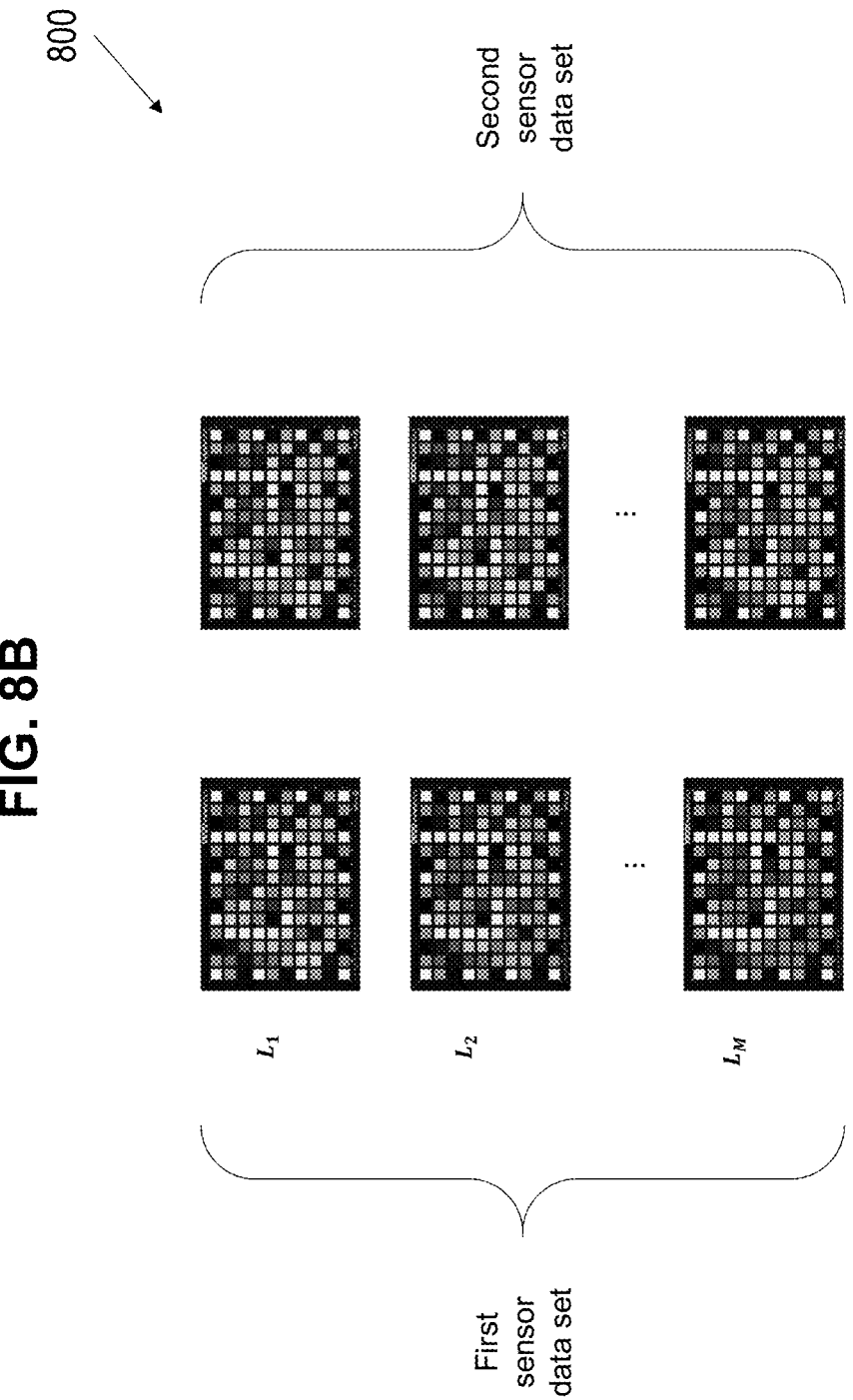

FIGS. 8A and 8B illustrate a process of collecting an illumination data set for estimating a color transform according to embodiments of the present disclosure.

As shown in FIG. 8A, a light box 10 may be used to illuminate a color calibration pattern 20 under different illumination conditions to obtain illuminations $L_1$ to $L_M$. In embodiments, the light box 10 may be variable or tunable to emit light in a range of wavelengths or frequencies, which may simplify the process of collecting the illumination data set. For example, the light box 10 may be variable or tunable to emit light corresponding to each of the illuminations $L_1$ to $L_M$, which may include, for example, sunlight (or daylight), light emitting diode (LED) light, incandescent, fluorescent, and the like. In FIG. 8A, the color calibration pattern 20 is illustrated as a color chart, but embodiments of the present disclosure are not limited thereto, and diverse examples of colorful materials may be used instead of the color chart. For example, in embodiments the color calibration pattern 20 may include various samples of materials having different textures and colors, or a collection of various items may be used as the color calibration pattern 20.

In operation S701 of FIG. 7, images of the color calibration pattern 20 may be captured using the first image sensor 120A and the second image sensor 120B under the different illumination conditions to obtain the first illumination data set and the second illumination data set. For example, a first pair of color calibration images under sunlight, a second pair of color calibration images under LED light, a third pair of color calibration images under incandescent light, and a fourth pair of color calibration images under fluorescent light may be captured and collected as training data for the transform estimator. Examples of the first illumination data set and the second illumination data set are shown in FIG. 8B.

Figure 9:
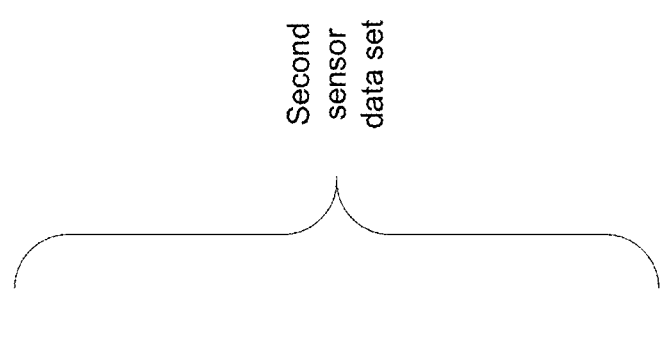
FIG. 9 illustrates a method of computing transforms between the two sensors based on illumination data sets, according to embodiments of the present disclosure.
Figure 9:
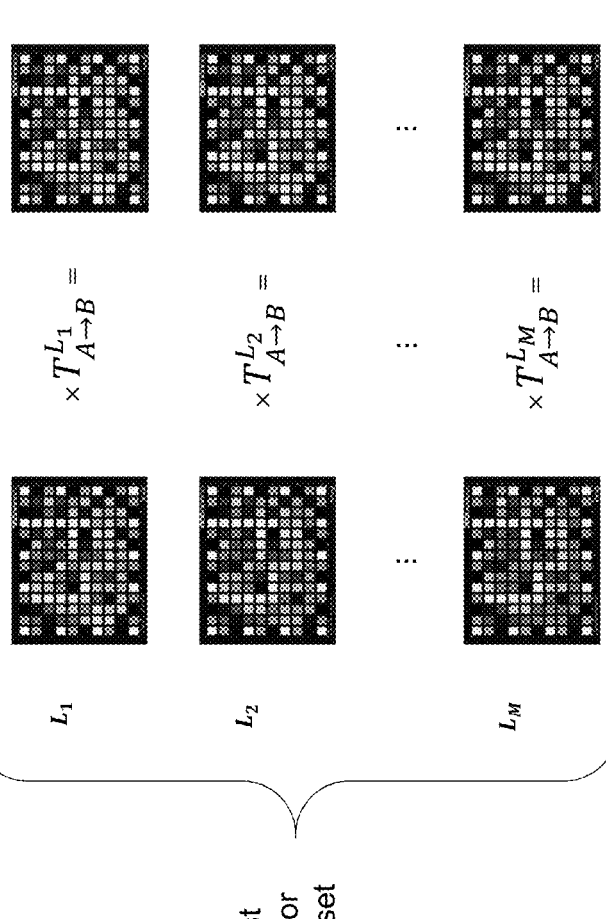

FIG. 9 illustrates a method of computing transforms based on illumination data sets, according to embodiments of the present disclosure. In operation S702, the illuminations $L_1$ to $L_M$ may be extracted from the color calibration images included in the first illumination data set. In embodiments, the illuminations $L_1$ to $L_M$ may be determined using the auto-white-balance module 210, or based on the neutral patch 301 included in the color calibration pattern 20. Then, the transforms $$T_{A \to B}^{L_1} \text{ to } T_{A \to B}^{L_M}$$

may be calculated based on the extracted illuminations $L_1$ to $L_M$ and the color calibration images. For example, the transforms $$T_{A \to B}^{L_1} \text{ to } T_{A \to B}^{L_M}$$

may be calculated using a least squares method as in Equation 4. The illuminations $L_1$ to $L_M$ and the transforms $$T_{A \to B}^{L_1} \text{ to } T_{A \to B}^{L_M}$$

may be included in a training data set used to train the transform estimator. In embodiments, the training data set may correspond to the transform data set $$\left\{ L_j, T_{A \to B}^{L_j} \right\}_{j=1}^{M}$$

discussed above.

Figure 10A:
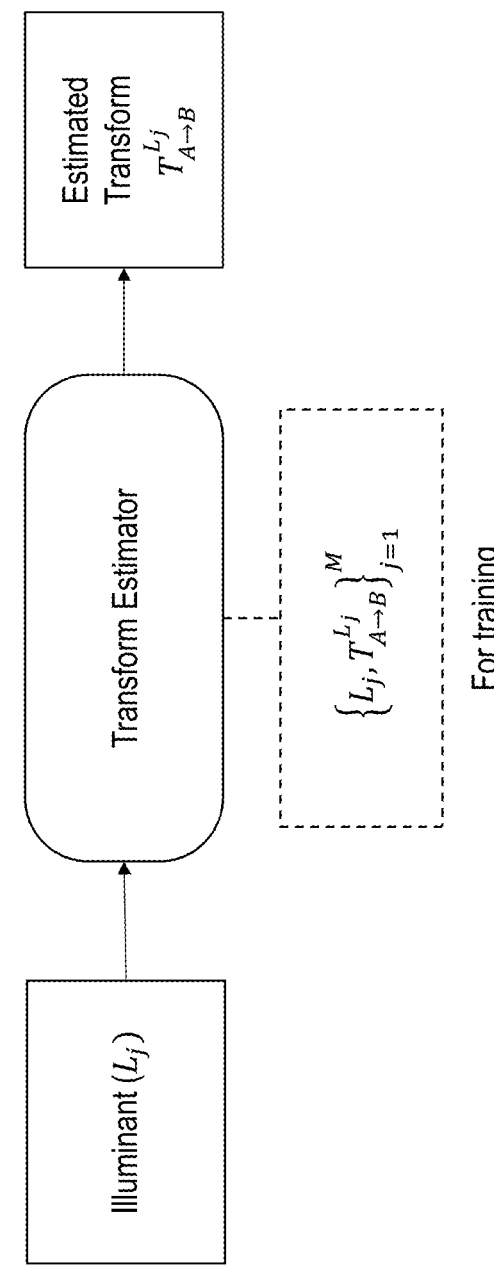
FIG. 10A illustrates a method of training a neural network-based transform estimator according to embodiments of the present disclosure.

FIG. 10A illustrates a method of training a neural network-based transform estimator according to embodiments of the present disclosure.

In embodiments, the method illustrated in FIG. 10A may correspond to operation S703 of FIG. 7, and may be used to train a transform estimator which includes at least one neural network which is trained to predict a transform that is used to perform operation S704 of FIG. 7.

Figure 10B:
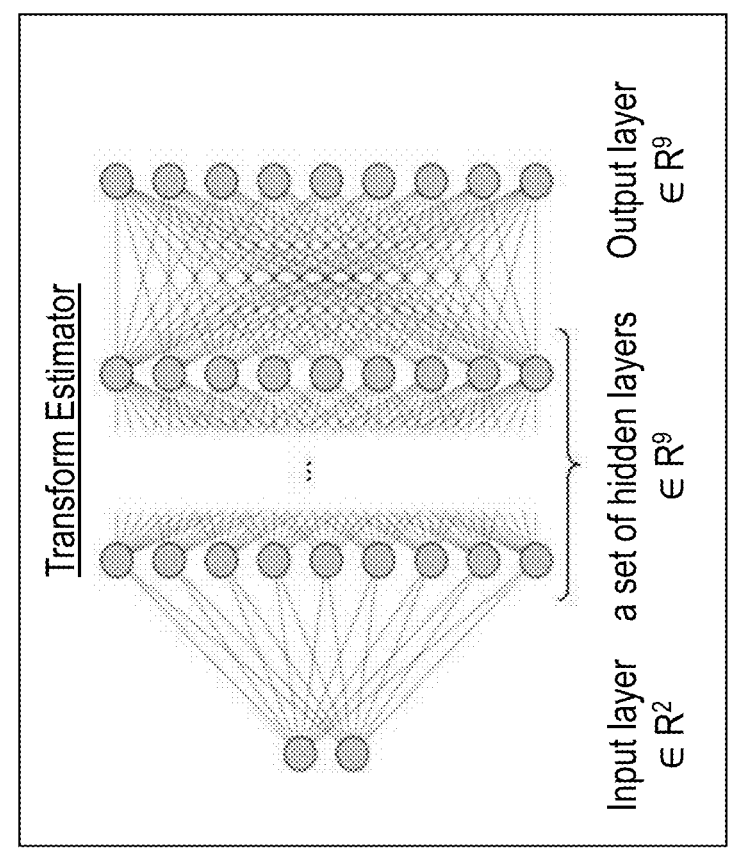
FIG. 10B illustrates a structure of a neural network configured to estimate color transforms according to embodiments of the present disclosure.
Figure 10B:
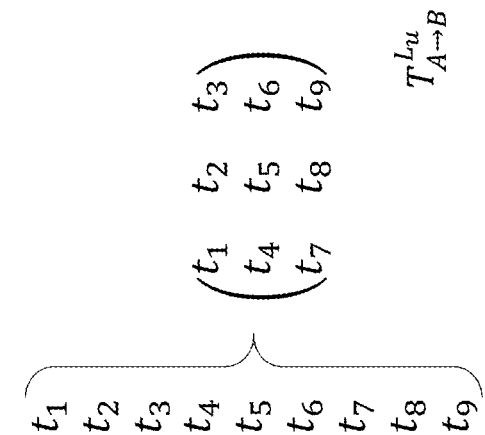
Figure 10B:

The transform estimator may be implemented as a neural network such as a multi-layer perceptron (MLP), and may have a network structure as shown in FIG. 10B. The transform estimator may receive an input illumination $L_j$ as input, and may output an estimated transform $$T_{A \to B}^{L_j}.$$

A difference between the estimated transform and a ground-truth transform may be computed as a loss of the transform estimator, and the loss may be back-propagated to the neural network to update node weights of the neural network. The transform estimator may be trained until the loss reaches a predetermined minimum value, or converges into a constant value with a preset margin. In embodiments, the ground-truth transform may be obtained from the training data set discussed above, which may be for example the transform data set $$\left\{ L_j, T_{A \to B}^{L_j} \right\}_{j=1}^{M}.$$

FIG. 10B illustrates a structure of a neural network configured to estimate transforms according to embodiments of the present disclosure.

As shown in FIG. 10B, the neural network may include an input layer, a set of hidden layers, and an output layer. For example, the input layer may include two nodes to receive an input illumination $L_u$ expressed as a two-dimensional coordinate [R/G, B/G]. For example, each of the hidden layers and the output layer may include nine nodes, but the number of the nodes is not limited thereto. The output layer may output a transform $$T_{A \to B}^{L_u}$$

that converts an image captured using the first image sensor 120A under the illumination $L_u$ to an image having a characteristic of the second image sensor 120B under the same illumination condition. In particular, the output layer may output matrix elements $(t_1, t_2, t_3, t_4, t_5, t_6, t_7, t_8, t_9)$ of the color transform $$T_{A \to B}^{L_u},$$

which may be converted into a matrix having the form shown in Equation 1.

As discussed above, the transform may be obtained using an artificial intelligence (AI)-based model such as a neural network, but embodiments of the present disclosure are not limited thereto. For example, the transform may be computed based on a machine learning method such as a k nearest neighbors method, or based on a mathematical algorithm using the transform data set discussed above.

Figure 11:
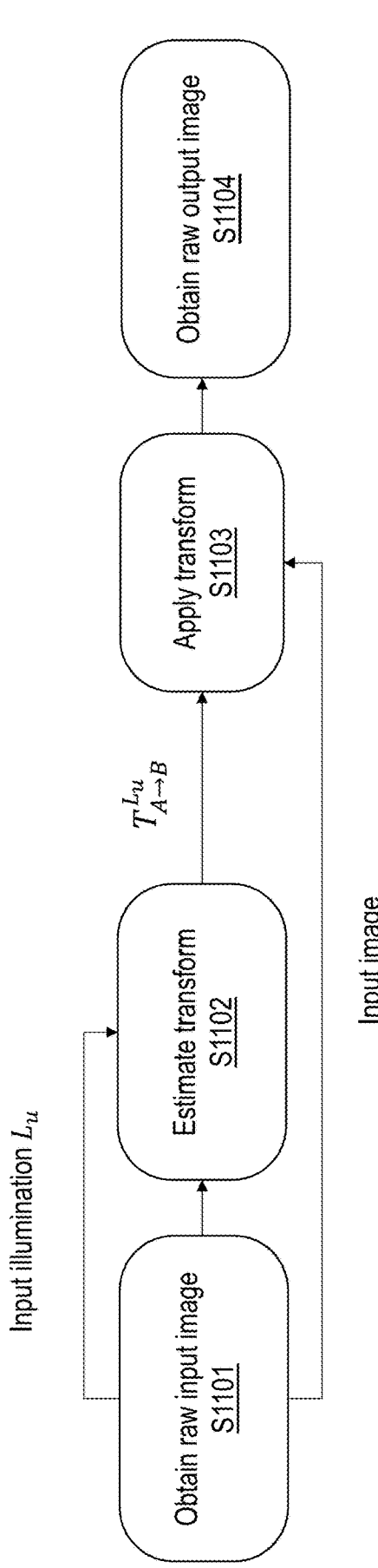
FIG. 11 illustrates a method of converting a raw input image captured using a first sensor to a raw output image having a characteristic of a second sensor, according to embodiments of the present disclosure.

FIG. 11 illustrates a method of converting a raw input image captured using a first sensor to a raw output image having a characteristic of a second sensor, according to embodiments of the present disclosure. In embodiments, the process 1100 may correspond to operation S704 of FIG. 7, and one or more of the operations of the process 1100 may be performed by any of the elements discussed above, for example the system 100, the processor 200, the color transform estimation module 220, and the color transformation module 230. In embodiments, the process 1100 may be referred to as a color transformation method.

In operation S1101, the process 1100 may include obtaining a raw input image. In embodiments, the raw input image may be captured using the first image sensor 120A under an input illumination $L_u$. In embodiments, the raw input image may have a characteristic of the first image sensor 120A. For example, the raw input image may have color values which correspond to the input illumination $L_u$ and a color response of the first image sensor 120A. In embodiments, the color response of the first image sensor 120A may correspond to, or be affected by, at least one of a spectral sensitivity of the first image sensor 120A and a noise profile of the first image sensor 120A.

In operation S1102, the process 1100 may include obtaining an estimated transform $$T_{A \to B}^{L_u}.$$

In embodiments, the estimated transform $$T_{A \to B}^{L_u}$$

may be estimated or predicted by the color transform estimation module 220, which may for example provide the input illumination $L_u$ to the trained transform estimator model. In embodiments, the estimated transform $$T_{A \to B}^{L_u}$$

may be a color transform that maps a characteristic of the first image sensor to a characteristic of a second image sensor, based on the input illumination $L_u$, which may be referred to as an input illumination condition.

In operation S1103, the process 1100 may include applying the estimated transform $$T_{A \to B}^{L_u}$$

to the raw input image. In embodiments, the estimated transform $$T_{A \to B}^{L_u}$$

may be applied using the color transformation module 230.

In operation S1104, the process 1100 may include obtaining a raw output image based on a result of applying the estimated transform $$T_{A \to B}^{L_u}$$

to the raw input image. In embodiments, the raw output image may have the characteristic of the second image sensor 120B. For example, the raw output image may have color values which correspond to the input illumination $L_u$ and a color response of the second image sensor 120B. In embodiments, the color response of the second image sensor 120B may correspond to, or be affected by, at least one of a spectral sensitivity of the second image sensor 1208 and a noise profile of the second image sensor 120B.

Figure 12:
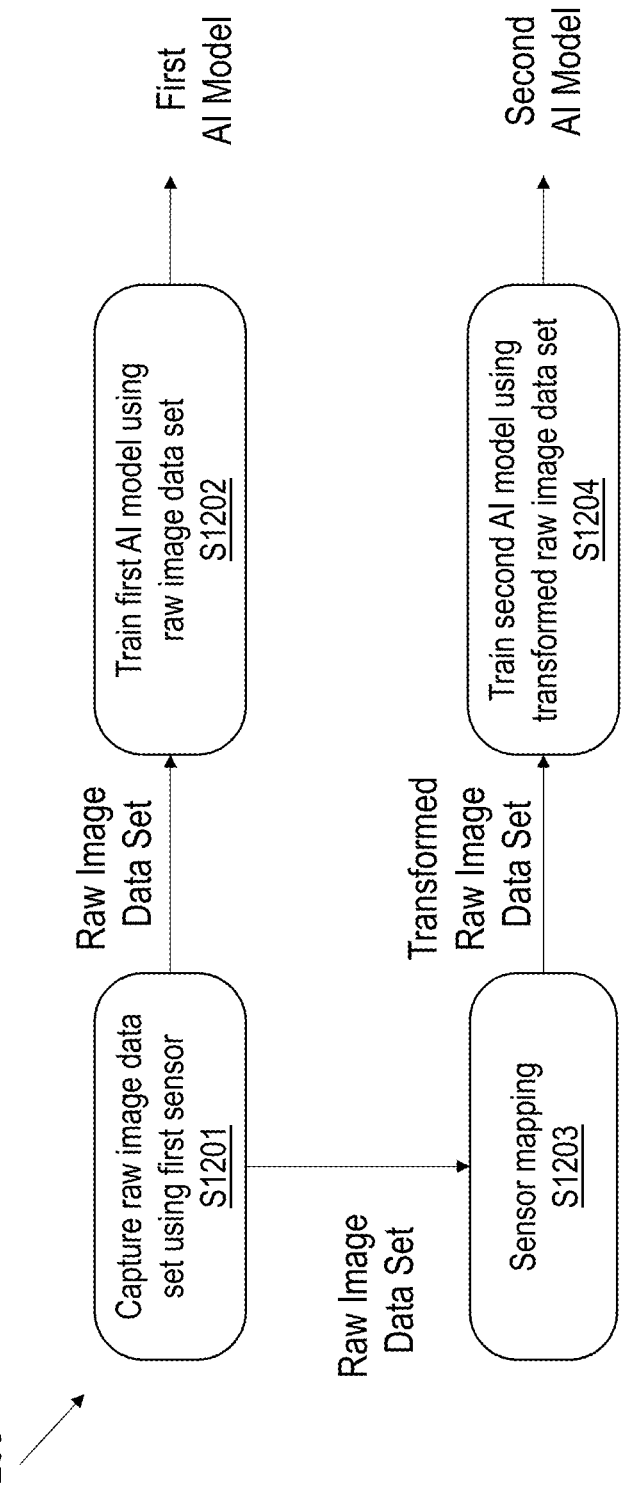
FIG. 12 illustrates a use application of a color transformation method according to embodiments of the present disclosure.

FIG. 12 illustrates a use application of a color transformation method according to embodiments of the present disclosure. In embodiments, one or more of the operations of the process 1200 may be performed by any of the elements discussed above, for example the system 100, the processor 200, the color transform estimation module 220, and the color transformation module 230.

In operation S1201, the process 1200 may include capturing a raw image data set using the first image sensor 120A. In embodiments, each of the raw images included in the raw image data set may have a characteristic of the first image sensor 120A. For example, the raw image data set may be a data set corresponding to the first image sensor 120A, and each of the raw images included in the raw image data set may have color values which correspond to one of the illuminations $L_1$ to $L_M$, and to a color response of the first image sensor 120A. In embodiments, the color response of the first image sensor 120A may correspond to, or be affected by, at least one of a spectral sensitivity of the first image sensor 120A and a noise profile of the first image sensor 120A.

In operation S1202, the process 1200 may include training a first AI model based on the raw image data set. For example, the first AI model may be an AI model which is suitable for processing images captured using the first image sensor 120A.

In operation S1203, the process 1200 may include performing sensor mapping on the raw image data set. For example, the trained transform estimator may be used to transform the raw image data set into a transformed raw image data set. In embodiments, each of the transformed raw images included in the transformed raw image data set may have a characteristic of the second image sensor 120B. For example, the transformed raw image data set may be a data set corresponding to the second image sensor 120B, and each of the transformed raw images included in the transformed raw image data set may have color values which correspond to one of the illumination conditions used to obtain the raw image data set (e.g., illumination conditions corresponding to illuminations $L_1$ to $L_M$), and a color response of the second image sensor 120B. In embodiments, the color response of the second image sensor 120B may correspond to, or be affected by, to at least one of a spectral sensitivity of the second image sensor 120B and a noise profile of the second image sensor 120B.

In embodiments, operation S1203 may further include training the transform estimator. For example, a plurality of transforms $$T_{A \to B}^{L_1} \text{ to } T_{A \to B}^{L_M}$$

corresponding to the illuminations $L_1$ to $L_M$ may be computed, a transform data set $$\left\{ L_j, T_{A \to B}^{L_j} \right\}_{j=1}^{M}$$

may be constructed and used to train the transform estimator.

In operation S1204, the process 1200 may include training a second AI model using the transformed raw image data set. For example, the second AI model may be an AI model which is suitable for processing images captured using the second image sensor 120B.

In embodiments, at least one of the raw image data set and the transformed raw image data set may be stored in an image database, for example in the memory 300.

In embodiments, one or more of the operations of the process 1200 may correspond to one or more operations discussed above. For example, in embodiments the operation S1203 may correspond to one or more operations of the process 700 of FIG. 7, or the process 1100 of FIG. 11. For example, the raw output image obtained in operation S1104 may be included in the transformed raw image data set, and may be used to train the second AI model.

In embodiments, the first AI model and the second AI model may be AI models for performing illumination estimation in an input raw image. In embodiments, illumination estimation may refer to a process of estimating an unknown illumination of a scene in order to remove a color cast in the raw image caused by this illumination. For example, the first AI model may be an AI model trained to perform illumination estimation based on input raw images captured using the first image sensor 120A. In embodiments, if the first AI model is used to perform illumination estimation on raw images captured using the second image sensor 120B, performance may be reduced due to differences between the raw image data set used to train the first AI model and the input images captured using the second image sensor 120B, which may be referred to as a domain gap. These differences may be caused by differences between the characteristics of the first image sensor 120A and the second image sensor 120B. Therefore, the process 1200 may be used to train the second AI model, which may have increased performance in comparison with the first AI model when applied to the raw images captured using the second image sensor 120B. Table 1 below shows an example of a mean angular error obtained by performing illumination estimation on images captured using the second image sensor 120B using the first AI model, the second AI model, and a third AI model which is trained on a raw image data set captured directly by the second image sensor 120B.

TABLE 1

| AI Model | Testing sensor | Mean angular error (lower is better) |
|---|---|---|
| First AI model | B | 4.46 |
| Second AI model | B | 2.47 (↓44.6%) |
| Third AI model | B | 1.61 |

As can be seen in Table 1, training the AI model based on the transformed image data (e.g., the second AI model)

improves performance by about 45% compared to training the AI model based on the raw image data set (e.g., the first AI model).

Figure 13:
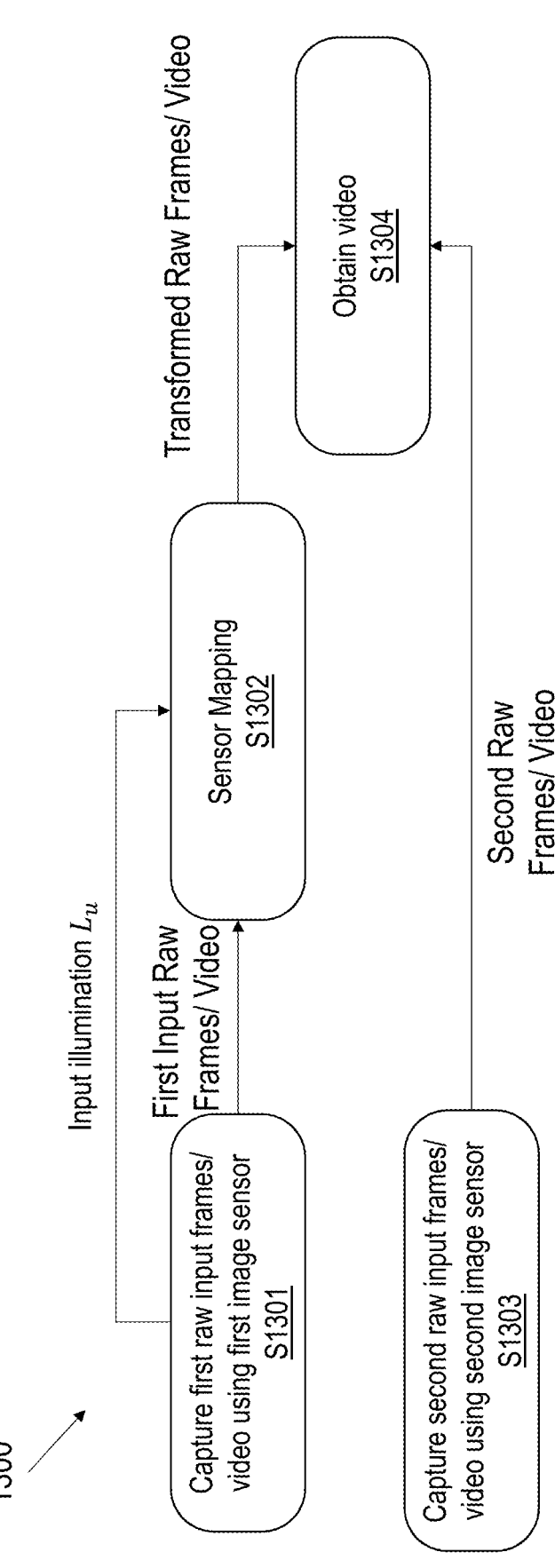
FIG. 13 illustrates a use application of a color transformation method according to embodiments of the present disclosure.

FIG. 13 illustrates a use application of a color transformation method according to embodiments of the present disclosure. In embodiments, one or more of the operations of the process 1300 may be performed by any of the elements discussed above, for example the system 100, the processor 200, the color transform estimation module 220, and the color transformation module 230.

In operation S1301, the process 1300 may include capturing first raw input frames/video using the first image sensor 120A. In embodiments, the first raw input frames/video may include or correspond to the raw input image discussed above. In embodiments, the first raw input frames/video may have a characteristic of the first image sensor 120A. For example, the first raw input frames/video may have color values which correspond to an input illumination $L_u$, and to a color response of the first image sensor 120A. In embodiments, the color response of the first image sensor 120A may correspond to, or be affected by, at least one of a spectral sensitivity of the first image sensor 120A and a noise profile of the first image sensor 120A.

In operation S1302, the process 1300 may include performing sensor mapping on the first raw input frames/video. For example, the trained transform estimator may be used to transform the first raw input frames/video into transformed raw frames/video. In embodiments, the transformed raw frames/video may be referred to as output raw frames/video, and may include or correspond to the output raw image discussed above. In embodiments, the transformed raw frames/video may have a characteristic of the second image sensor 120B. For example, the transformed raw frames/video may have color values which correspond to the input illumination $L_u$, and to a color response of the second image sensor 120B. In embodiments, the color response of the second image sensor 120B may correspond to, or be affected by, at least one of a spectral sensitivity of the second image sensor 120B and a noise profile of the second image sensor 120B.

In operation S1303, the process 1300 may include capturing second raw frames/video using the second image sensor 120B. In embodiments, the second raw frames/video may have a characteristic of the second image sensor 120B. For example, the second raw frames/video may have color values which correspond to the input illumination $L_u$, and to at least one of the spectral sensitivity of the second image sensor 120B and a noise profile of the second image sensor 120B.

In operation S1304, the process 1300 may include obtaining a video based on the transformed raw frames/video and the second raw frames/video. As an example, the video may be a live stream to a display. As another example, the video may be or may include a pre-stored video. For example, in embodiments the first image sensor 120A and the second image sensor 120B may be included in a mobile device such as a smartphone, and may be used to capture images or videos having different zoom levels or fields of view. Because the first image sensor 120A and the second image sensor 120B may have different characteristics, a video generated using the first image sensor and the second image sensor may have inconsistent color appearance. For example, it may be difficult to produce a consistent color appearance for the video generated using the first image sensor 120A and the second image sensor 120B. For example, the mobile device may have separate ISPs to process the raw frames/video captured using the first and second image sensors 120A and 120B. When a user performs a zoom function, a captured video may switch from one camera to another based on a certain zoom factor being reached. In order to avoid an undesirable change in color characteristics, the ISP parameters of the separate ISPs may be carefully tuned such that they produce output images/video with the same color characteristics. However, this tuning may be difficult to perform and implement, and may produce results which are not entirely satisfactory. Therefore, according to embodiments, the raw frames/video captured using the first image sensor 120A may be transformed into raw frames/video having the characteristic of the second image sensor 120B, and a single ISP may be used for both image sensors.

In embodiments, one or more of the operations of the process 1300 may correspond to one or more operations discussed above. For example, in embodiments the operation S1303 may correspond to one or more operations of the process 700 of FIG. 7, or the process 1100 of FIG. 11. For example, the raw output image obtained in operation S1104 may correspond to the transformed first raw image obtained in operation S1302.

Figure 14:
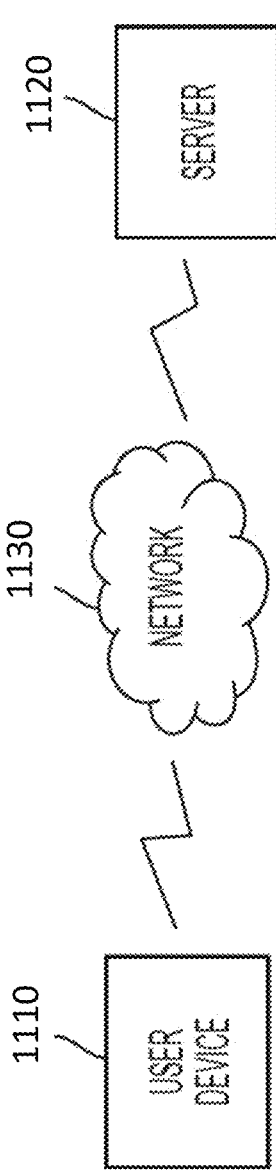
FIG. 14 is a diagram of devices for performing color transformation according to embodiments of the present disclosure.

FIG. 14 is a diagram of devices for performing color transform estimation according to embodiments of the present disclosure. FIG. 14 includes a user device 1110, a server 1120, and a network 1130. The user device 1110 and the server 1120 may interconnect via wired connections, wireless connections, or a combination of wired and wireless connections. An electronic device illustrated in FIG. 1 may correspond to the user device 1110 or a combination of the user device 1110 and the server 1120. For example, all or at least a part of the processor 200 illustrated in FIG. 1 may be included in the server 1120, and the rest of the elements illustrated in FIG. 1 may be included in the user device 1110.

The user device 1110 includes one or more devices configured to generate a raw output image. For example, the user device 1110 may include a computing device (e.g., a desktop computer, a laptop computer, a tablet computer, a handheld computer, a smart speaker, a server, etc.), a mobile phone (e.g., a smart phone, a radiotelephone, etc.), a camera device (e.g., a first camera 100A or a second camera 100B illustrated in FIG. 1), a wearable device (e.g., a pair of smart glasses or a smart watch), or a similar device.

The server 1120 includes one or more devices configured to receive an image and perform an AI-based image processing on the image to obtain a color-transformed image, according to a request from the user device 1110.

The network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 14 are provided as an example. In practice, there may be additional devices and/or networks, fewer devices and/or networks, different devices and/or networks, or differently arranged devices and/or networks than those shown in FIG. 14. Furthermore, two or more devices shown in FIG. 14 may be implemented within a single device, or a single device shown in FIG. 14 may be implemented as multiple, distributed devices. Additionally, or alternatively, a set of devices (e.g., one or more devices) may perform one or more functions described as being performed by another set of devices.

FIG. 15 is a diagram of components of one or more devices of FIG. 14 according to embodiments of the present disclosure. An electronic device 2000 may correspond to the user device 1110 and/or the server 1120.

The electronic device 2000 includes a bus 2010, a processor 2020, a memory 2030, an interface 2040, and a display 2050.

The bus 2010 includes a circuit for connecting the components 2020 to 2050 with one another. The bus 2010 functions as a communication system for transferring data between the components 2020 to 2050 or between electronic devices.

The processor 2020 includes one or more of a central processing unit (CPU), a graphics processor unit (GPU), an accelerated processing unit (APU), a many integrated core (MIC), a field-programmable gate array (FPGA), a digital signal processor (DSP), a machine learning accelerator, a neural processing unit (NPU). The processor 2020 may be a single core processor or a multi core processor. The processor 2020 is able to perform control of any one or any combination of the other components of the electronic device 2000, and/or perform an operation or data processing relating to communication. For example, the processor 2020 may include all or at least a part of the elements of the processor 200 illustrated in FIG. 1. The processor 2020 executes one or more programs stored in the memory 2030.

The memory 2030 may include a volatile and/or non-volatile memory. The memory 2030 stores information, such as one or more of commands, data, programs (one or more instructions), applications 2034, etc., which are related to at least one other component of the electronic device 2000 and for driving and controlling the electronic device 2000. For example, commands and/or data may formulate an operating system (OS) 2032. Information stored in the memory 2030 may be executed by the processor 2020. In particular, the memory 2030 may store original images and processed images (e.g., color transformed images).

The applications 2034 include the above-discussed embodiments. In particular, the applications 2034 may include programs to execute the auto-white-balance module 210, the color transform estimation module 220, and the color transformation module 230 of FIG. 1, and to perform one or more operations discussed above. These functions can be performed by a single application or by multiple applications that each carry out one or more of these functions. For example, the applications 2034 may include a photo editing application. When the photo editing application receives a user request to convert colors of a raw input image captured using a first image sensor to colors of a raw image captured using a second sensor, the photo editing application may identify an input illumination of the image using an auto-white-balance module, estimate at least one color transform, and apply the at least one color transform to the raw input image to transform the color of the raw input image to the colors of the raw image captured using the second sensor. The photo editing application may display and store the color transformed image.

The display 2050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 2050 can also be a depth-aware display, such as a multi-focal display. The display 2050 is able to present, for example, various contents, such as text, images, videos, icons, and symbols.

The interface 2040 includes input/output (I/O) interface 2042, communication interface 2044, and/or one or more sensors 2046. The I/O interface 2042 serves as an interface that can, for example, transfer commands and/or data between a user and/or other external devices and other component(s) of the electronic device 2000.

The communication interface 2044 may enable communication between the electronic device 2000 and other external devices, via a wired connection, a wireless connection, or a combination of wired and wireless connections. The communication interface 2044 may permit the electronic device 2000 to receive information from another device and/or provide information to another device. For example, the communication interface 2044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 2044 may receive or transmit a raw image, a processed image, and a target illumination from or to an external device.

The sensor(s) 2046 of the interface 2040 can meter a physical quantity or detect an activation state of the electronic device 2000 and convert metered or detected information into an electrical signal. For example, the sensor(s) 2046 can include one or more cameras (e.g., a camera 100 illustrated in FIG. 1) or other imaging sensors for capturing images of scenes. The sensor(s) 2046 can also include any one or any combination of a microphone, a keyboard, a mouse, and one or more buttons for touch input. The sensor(s) 2046 can further include an inertial measurement unit. In addition, the sensor(s) 2046 can include a control circuit for controlling at least one of the sensors included herein. Any of these sensor(s) 2046 can be located within or coupled to the electronic device 2000.

The color transformation method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to an electronic device, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The color transformation method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of a server.

A model related to the neural networks described above may be implemented via a software module. When the model is implemented via a software module (for example, a program module including instructions), the model may be stored in a computer-readable recording medium.

Also, the model may be a part of the electronic device described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

While the embodiments of the disclosure have been described with reference to the figures, it will be understood by those of ordinary skill in the art that various changes in form and details may be made therein without departing from the spirit and scope as defined by the following claims.

What is claimed is:

1. An electronic device for processing image data, the electronic device comprising:
    at least one memory configured to store instructions; and
    at least one processor configured to execute the instructions to:
        obtain a raw input image that is captured using a first image sensor and an input illumination condition corresponding to the raw input image;
        estimate, based on the input illumination condition, a color transform that maps a characteristic of the first image sensor to a characteristic of a second image sensor; and
        generate a raw output image having the characteristic of the second image sensor based on the raw input image and the color transform.

2. The electronic device of claim 1, wherein the characteristic of the first image sensor comprises a color response of the first image sensor which corresponds to a spectral sensitivity of the first image sensor, and
    wherein the characteristic of the second image sensor comprises a color response of the second image sensor which corresponds to a spectral sensitivity of the second image sensor.

3. The electronic device of claim 1, wherein the at least one processor is further configured to execute the instructions to estimate the color transform using an artificial intelligence (AI) model which is trained based on a plurality of raw image pairs corresponding to a plurality of illumination conditions, and
    wherein each raw image pair comprises a first raw image captured using the first image sensor under an illumination condition from among the plurality of illumination conditions, and a second raw image captured using the second image sensor under the illumination condition.

4. The electronic device of claim 3, wherein the plurality of raw image pairs are obtained using a variable light source configured to apply the plurality of illumination conditions to an object.

5. The electronic device of claim 4, wherein the object comprises a color calibration pattern including a plurality of colors, and
    wherein the color calibration pattern comprises a plurality of textures corresponding to the plurality of colors.

6. The electronic device of claim 1, wherein the raw input image and the raw output image are not white-balance corrected.

7. The electronic device of claim 1, further comprising an input interface,
    wherein the at least one processor is further configured to obtain the color transform and generate the raw output image based on receiving information about the second image sensor through the input interface.

8. The electronic device of claim 1, wherein the first image sensor is included in an external device, and the second image sensor is included in the electronic device,
    wherein the electronic device further comprises a communication interface configured to receive the raw input image from the external device, and
    wherein the at least one processor is further configured to execute the instructions to convert the raw input image that is received from the external device, into the raw output image having the characteristic of the second image sensor based on the color transform.

9. The electronic device of claim 1, wherein the at least one processor is further configured to execute the instructions to:
    obtain an image data set comprising a plurality of raw first images captured using the first image sensor;
    obtain, using the transform estimator, a plurality of color transforms that map the characteristic of the first image sensor to the characteristic of the second image sensor, wherein the plurality of color transforms comprises the color transform;
    create a transformed data set comprising a plurality of raw second images having the characteristic of the second image sensor based on the plurality of raw first images and the plurality of color transforms, wherein the plurality of raw second images comprises the raw output image; and
    input the transformed data set to an artificial intelligence (AI)-based image processing model to train the AI-based image processing model.

10. The electronic device of claim 1, further comprising the first image sensor and the second image sensor,
    wherein the raw input image comprises a first raw input video frame,
    wherein the raw output image comprises a raw output video frame, and
    wherein the at least one processor is further configured to:
        obtain a second raw input video frame that is captured using the second image sensor; and
        generate a video based on the raw output video frame and the second raw input video frame.

11. The electronic device of claim 1, wherein, to estimate the color transform, the at least one processor is further configured to execute the instructions to:
    provide the input illumination condition as an input to an artificial intelligence (AI) model; and
    obtain the color transform based on an output of the AI model.

12. A method for processing image data, the method being performed by at least one processor and comprising:
    obtaining a raw input image that is captured using a first image sensor and an input illumination condition corresponding to the raw input image;
    estimating, based on the input illumination condition, a color transform that maps a characteristic of the first image sensor to a characteristic of a second image sensor; and
    generating a raw output image having the characteristic of the second image sensor based on the raw input image and the color transform.

13. The method of claim 12, wherein the characteristic of the first image sensor comprises a color response of the first image sensor which corresponds to a spectral sensitivity of the first image sensor, and wherein the characteristic of the second image sensor comprises a color response of the second image sensor which corresponds to a spectral sensitivity of the second image sensor.

14. The method of claim 12, wherein the estimating is performed using an artificial intelligence (AI) model which is trained based on a plurality of raw image pairs corresponding to a plurality of illumination conditions, and wherein each raw image pair comprises a first raw image captured using the first image sensor under an illumination condition from among the plurality of illumination conditions, and a second raw image captured using the second image sensor under the illumination condition.

15. The method of claim 14, wherein the plurality of raw image pairs are obtained using a variable light source configured to apply the plurality of illumination conditions to an object.

16. The method of claim 15, wherein the object comprises a color calibration pattern including a plurality of colors, and wherein the color calibration pattern comprises a plurality of textures corresponding to the plurality of colors.

17. The method of claim 12, wherein the color transform is obtained and the raw output image is generated based on receiving information about the second image sensor through an input interface.

18. The method of claim 12, wherein the first image sensor is included in a first electronic device, and the second image sensor is included in a second electronic device which includes the at least one processor, wherein the second electronic device comprises a communication interface configured to receive the raw input image from the first electronic device, and wherein the method further comprises converting the raw input image that is received from the first electronic device, into the raw output image having the characteristic of the second image sensor based on the color transform.

19. The method of claim 12, wherein the method further comprises:

obtaining an image data set comprising a plurality of raw first images captured using the first image sensor;

estimating a plurality of color transforms that map the characteristic of the first image sensor to the characteristic of the second image sensor, wherein the plurality of color transforms comprises the color transform;

creating a transformed data set comprising a plurality of raw second images having the characteristic of the second image sensor based on the plurality of raw first images and the plurality of color transforms, wherein the plurality of raw second images comprises the raw output image; and inputting the transformed data set to an artificial intelligence (AI)-based image processing model to train the AI-based image processing model.

20. The method of claim 12, wherein the at least one processor, the first image sensor, and the second image sensor are included in an electronic device, wherein the raw input image comprises a first raw input video frame, wherein the raw output image comprises a raw output video frame, and wherein the method further comprises:

obtaining a second raw input video frame that is captured using the second image sensor; and generating a video based on the raw output video frame and the second raw input video frame.

21. A non-transitory computer-readable medium configured to store instructions which, when executed by at least one processor of a device for processing image data, cause the at least one processor to:

obtain a raw input image that is captured using a first image sensor and an input illumination condition corresponding to the raw input image;

estimate, based on the input illumination condition, a color transform that maps a characteristic of the first image sensor to a characteristic of a second image sensor; and generate a raw output image having the characteristic of the second image sensor based on the raw input image and the color transform.

* * * * *